US012749178B2

(12) United States Patent
Johannesson et al.

(10) Patent No.: US 12,749,178 B2
(45) Date of Patent: Sep. 29, 2026

(54) METHODS AND SYSTEMS FOR PREDICTING NEURODEGENERATIVE DISEASE STATE

(71) Applicant: New York Stem Cell Foundation, Inc., New York, NY (US)

(72) Inventors: Bjarki Johannesson, New York, NY (US); Bianca Migliori, New York, NY (US); Frederick J. Monsma, Jr., Summit, NJ (US); Scott Noggle, New Rochelle, NY (US); Daniel Paull, New York, NY (US)

(73) Assignee: New York Stem Cell Foundation, Inc., New York, NY (US)

( * ) Notice: Subject to any disclaimer, the term of this patent is extended or adjusted under 35 U.S.C. 154(b) by 459 days.

(21) Appl. No.: 18/026,987

(22) PCT Filed: Sep. 17, 2021

(86) PCT No.: PCT/US2021/050968

§ 371 (c)(1),
(2) Date: Mar. 17, 2023

(87) PCT Pub. No.: WO2022/061176

PCT Pub. Date: Mar. 24, 2022

(65) Prior Publication Data

US 2023/0351587 A1 Nov. 2, 2023

Related U.S. Application Data

(60) Provisional application No. 63/080,362, filed on Sep. 18, 2020.

(51) Int. Cl.
*G06T 7/00* (2017.01)
*G06V 10/42* (2022.01)
(Continued)

(52) U.S. Cl.
CPC ........... *G06T 7/0012* (2013.01); *G06V 10/42* (2022.01); *G06V 10/54* (2022.01); *G06V 10/764* (2022.01);
(Continued)

(58) Field of Classification Search
CPC ........... G06T 7/0012; G06T 2207/1005; G06T 2207/10064; G06T 2207/20081;
(Continued)

(56) References Cited

U.S. PATENT DOCUMENTS 11,004,199 B2 * 5/2021 Mouton ................. G06N 20/00
11,739,370 B1 * 8/2023 Jensen ................. C12Q 1/6823
435/6.11

(Continued)

OTHER PUBLICATIONS

International Search Report and Written Opinion of PCT/US2021/050968 dated Dec. 27, 2021, 11 pages.

(Continued)

*Primary Examiner* — Tom Y Lu
(74) *Attorney, Agent, or Firm* — Goodwin Procter LLP

(57) ABSTRACT

The present disclosure provides automated methods and systems for implementing a pipeline involving the training and deployment of a predictive model for predicting cellular diseased state (e.g., neurodegenerative disease state such as presence or absence of Parkinson's Disease). Such a predictive model distinguishes between morphological cellular phenotypes e.g., morphological cellular phenotypes elucidated using Cell Paint, exhibited by cells of different diseased states.

20 Claims, 23 Drawing Sheets

(51) Int. Cl.
*G06V 10/54* (2022.01)
*G06V 10/764* (2022.01)

(52) U.S. Cl.
CPC ............... *G06T 2207/10056* (2013.01); *G06T 2207/10064* (2013.01); *G06T 2207/20081* (2013.01); *G06T 2207/20084* (2013.01); *G06T 2207/30004* (2013.01)

(58) Field of Classification Search
CPC ........... G06T 2207/20084; G06T 2207/30004; G06V 10/04; G06V 10/54; G06V 10/764; G06V 10/82; G06V 20/698
See application file for complete search history.

(56) References Cited

U.S. PATENT DOCUMENTS

| | | | | |
|---|---|---|---|---|
| 2014/0329264 | A1* | 11/2014 | Chirila | G01N 33/6896 435/29 |
| 2017/0014450 | A1* | 1/2017 | Joyce | A61K 35/14 |
| 2019/0049430 | A1* | 2/2019 | MacMillan-Crow | G01N 33/5008 |
| 2019/0148021 | A1 | 5/2019 | Styner et al. | |
| 2019/0228840 | A1 | 7/2019 | Kamens et al. | |
| 2022/0058369 | A1* | 2/2022 | Alahmari | G06F 18/285 |
| 2022/0215543 | A1* | 7/2022 | Inoue | G16H 30/40 |
| 2023/0349906 | A1* | 11/2023 | Chase | G16H 10/40 |

OTHER PUBLICATIONS

EP Appl. No. 21870330.4 Extended European Search Report dated Aug. 28, 2024, 9 pages.

Mudali, D. et al., Probing the characteristics and biofunctional effects of disease-affected cells and drug response via machine learning applications, Critical Reviews In Biotechnology, 40(7): 951-977 (2020).

Saberi-Bosari, S. et al., Deep learning-enabled phenotyping reveals distinct patterns of neurodegeneration induced by aging and cold-shock, bioRxiv, Mar. 9, 2020 (Mar. 9, 2020), pp. 1-25, XP093196741, DOI: 10.1101 /2020.03.08.982074.

Bray, M. et al., Cell Painting, a high-content image-based assay for morphological profiling using multiplexed fluorescent dyes, Nat. Protoc., 11(9): 1757-1774 (2016).

Carpenter, A. E. et al., CellProfiler: image analysis software for identifying and quantifying cell phenotypes, Genome Biol. 7, R100 (2006).

Paull, D. et al., Automated, high-throughput derivation, characterization and differentiation of induced pluripotent stem cells, Nat. Methods, 12:885-892 (2015).

Schiff, L. et al., Deep learning and automated Cell Painting reveal Parkinson's disease-specific signatures in primary patient fibroblasts, bioRxiv 2020.11.13.380576 (2020).

* cited by examiner

METHODS AND SYSTEMS FOR PREDICTING NEURODEGENERATIVE DISEASE STATE

CROSS REFERENCE TO RELATED APPLICATIONS

This application claims the benefit of and priority to U.S. Provisional Patent Application No. 63/080,362 filed Sep. 18, 2020, the entire disclosure of which is hereby incorporated by reference in its entirety for all purposes.

FIELD OF INVENTION

The present invention relates generally to the field of predictive analytics, and more specifically to automated methods and systems for predicting cellular disease states, such as neurodegenerative disease states.

BACKGROUND OF THE INVENTION

Parkinson's Disease (PD) is the second most common progressive neurodegenerative disease affecting 2-3% of individuals older than 65 with a worldwide prevalence of 3% over 80 years of age (Poewe et al., 2017). PD is characterized by the loss of dopamine producing neurons in the substantia nigra and intracellular alpha-synuclein protein accumulation resulting in clinical pathologies including tremor, bradykinesia and loss of motor movement (Beitz, 2014). Although genetic aberrations including mutations in GBA (Sidransky & Lopez, 2012), LRRK2 (Healy et al., 2008) and SNCA (Chartier-Harlin et al., 2004) have been associated with PD risk, over 90% of PD diagnoses are sporadic (nonfamilial) or without an identified genetic risk.

Although substantial progress has been made to better understand the underlying physiology of PD, there are no curative treatments or reliable biomarkers (Oertel, 2017). Additionally, drug discovery is costly (up to US$2.6 billion) and time intensive with average development taking a minimum of 12 years (Avorn, 2015)(Mohs & Greig, 2017). However, new advancements in artificial intelligence (AI) and deep learning approaches may pave the way to accelerate therapeutic discovery specifically in drug repurposing (Mohs & Greig, 2017; Stokes et al., 2020), distinguishing cellular phenotypes (Michael Ando et al., 2017) and elucidating mechanisms of action (Ashdown et al., n.d.). In parallel, the use of large data sets such as high-content imaging has the ability to capture patient-specific patterns to glean insights into human pathology. Several works have reported the use of AI and large data sets to uncover disease phenotypes and biomarkers, but the power of these studies is limited due to small sample sizes (Yang et al., 2019) (Teves et al., 2017).

SUMMARY OF THE INVENTION

Disclosed herein are methods and systems for developing an automated high-throughput screening platform for the morphology-based profiling of Parkinson's Disease. Disclosed herein is a method comprising: obtaining or having obtained a cell; capturing one or more images of the cell; and analyzing the one or more images using a predictive model to predict a neurodegenerative disease state of the cell, the predictive model trained to distinguish between morphological profiles of cells of different neurodegenerative disease states. In various embodiments, methods disclosed herein further comprise: prior to capturing one or more images of the cell, providing a perturbation to the cell; and subsequent to analyzing the one or more images, comparing the predicted neurodegenerative disease state of the cell to a neurodegenerative disease state of the cell known before providing the perturbation; and based on the comparison, identifying the perturbation as having one of a therapeutic effect, a detrimental effect, or no effect.

In various embodiments, the predictive model is one of a neural network, random forest, or regression model. In various embodiments, the neural network is a multilayer perceptron model. In various embodiments, the regression model is one of a logistic regression model or a ridge regression model. In various embodiments, each of the morphological profiles of cells of different neurodegenerative disease states comprise values of imaging features or comprise a transformed representation of images that define a neurodegenerative disease state of a cell. In various embodiments, the imaging features comprise one or more of cell features or non-cell features. In various embodiments, the cell features comprise one or more of cellular shape, cellular size, cellular organelles, object-neighbors features, mass features, intensity features, quality features, texture features, and global features. In various embodiments, the non-cell features comprise well density features, background versus signal features, and percent of touching cells in a well. In various embodiments, the cell features are determined via fluorescently labeled biomarkers in the one or more images.

In various embodiments, the morphological profile is extracted from a layer of a deep learning neural network. In various embodiments, the morphological profile is an embedding representing a dimensionally reduced representation of values of the layer of the deep learning neural network. In various embodiments, the layer of the deep learning neural network is the penultimate layer of the deep learning neural network. In various embodiments, the predicted neurodegenerative disease state of the cell predicted by the predictive model is a classification of at least two categories. In various embodiments, the at least two categories comprise a presence or absence of a neurodegenerative disease. In various embodiments, the at least two categories comprise a first subtype or a second subtype of a neurodegenerative disease. In various embodiments, the at least two categories further comprises a third subtype of the neurodegenerative disease. In various embodiments, the neurodegenerative disease is any one of Parkinson's Disease (PD), Alzheimer's Disease, Amyotrophic Lateral Sclerosis (ALS), Infantile Neuroaxonal Dystrophy (INAD), Multiple Sclerosis (MS), Amyotrophic Lateral Sclerosis (ALS), Batten Disease, Charcot-Marie-Tooth Disease (CMT), Autism, post-traumatic stress disorder (PTSD), schizophrenia, frontotemporal dementia (FTD), multiple system atrophy (MSA), and a synucleinopathy. In various embodiments, the first subtype comprises a LRRK2 subtype. In various embodiments, the second subtype comprises a sporadic PD subtype. In various embodiments, the third subtype comprises a GBA subtype. In various embodiments, the cell is one of a stem cell, partially differentiated cell, or terminally differentiated cell. In various embodiments, the cell is a somatic cell. In various embodiments, the somatic cell is a fibroblast or a peripheral blood mononuclear cell (PBMC). In various embodiments, the cell is obtained from a subject through a tissue biopsy. In various embodiments, the tissue biopsy is obtained from an extremity of the subject.

In various embodiments, the predictive model is trained by: obtaining or having obtained a cell of a known neurodegenerative disease state; capturing one or more images of the cell of the known neurodegenerative disease state; and using the one or more images of the cell of the known neurodegenerative disease state, training the predictive model to distinguish between morphological profiles of cells of different diseased states. In various embodiments, the known neurodegenerative disease state of the cell serves as a reference ground truth for training the predictive model.

In various embodiments, methods disclosed herein further comprise: prior to capturing the one or more images of the cell, staining or having stained the cell using one or more fluorescent dyes. In various embodiments, the one or more fluorescent dyes are Cell Paint dyes for staining one or more of a cell nucleus, cell nucleoli, plasma membrane, cytoplasmic RNA, endoplasmic reticulum, actin, Golgi apparatus, and mitochondria. In various embodiments, each of the one or more images correspond to a fluorescent channel. In various embodiments, the steps of obtaining the cell and capturing the one or more images of the cell are performed in a high-throughput format using an automated array. In various embodiments, analyzing the one or more images using a predictive model comprises: dividing the one or more images into a plurality of tiles; and analyzing the plurality of tiles using the predictive model on a per-tile basis. In various embodiments, one or more tiles in the plurality of tiles each comprise a single cell.

Additionally disclosed herein is a non-transitory computer readable medium comprising instructions that, when executed by a processor, cause the processor to: capture one or more images of the cell; and analyze the one or more images using a predictive model to predict a neurodegenerative disease state of the cell, the predictive model trained to distinguish between morphological profiles of cells of different neurodegenerative disease states. In various embodiments, non-transitory computer readable media disclosed herein further comprises instructions that, when executed by the processor, cause the processor to: subsequent to analyze the one or more images, compare the predicted neurodegenerative disease state of the cell to a neurodegenerative disease state of the cell known before a perturbation was provided to the cell; and based on the comparison, identify the perturbation as having one of a therapeutic effect, a detrimental effect, or no effect.

In various embodiments, the predictive model is one of a neural network, random forest, or regression model. In various embodiments, the neural network is a multilayer perceptron model. In various embodiments, the regression model is one of a logistic regression model or a ridge regression model. In various embodiments, each of the morphological profiles of cells of different neurodegenerative disease states comprise values of imaging features or comprise a transformed representation of images that define a neurodegenerative disease state of a cell. In various embodiments, the imaging features comprise one or more of cell features or non-cell features. In various embodiments, the cell features comprise one or more of cellular shape, cellular size, cellular organelles, object-neighbors features, mass features, intensity features, quality features, texture features, and global features. In various embodiments, the non-cell features comprise well density features, background versus signal features, and percent of touching cells in a well. In various embodiments, the cell features are determined via fluorescently labeled biomarkers in the one or more images.

In various embodiments, the morphological profile is extracted from a layer of a deep learning neural network. In various embodiments, the morphological profile is an embedding representing a dimensionally reduced representation of values of the layer of the deep learning neural network. In various embodiments, the layer of the deep learning neural network is the penultimate layer of the deep learning neural network. In various embodiments, the predicted neurodegenerative disease state of the cell predicted by the predictive model is a classification of at least two categories. In various embodiments, the at least two categories comprise a presence or absence of a neurodegenerative disease. In various embodiments, the at least two categories comprise a first subtype or a second subtype of a neurodegenerative disease. In various embodiments, the at least two categories further comprises a third subtype of the neurodegenerative disease. In various embodiments, the neurodegenerative disease is any one of Parkinson's Disease (PD), Alzheimer's Disease, Amyotrophic Lateral Sclerosis (ALS), Infantile Neuroaxonal Dystrophy (INAD), Multiple Sclerosis (MS), Amyotrophic Lateral Sclerosis (ALS), Batten Disease, Charcot-Marie-Tooth Disease (CMT), Autism, post-traumatic stress disorder (PTSD), schizophrenia, frontotemporal dementia (FTD), multiple system atrophy (MSA), and a synucleinopathy.

In various embodiments, the first subtype comprises a LRRK2 subtype. In various embodiments, the second subtype comprises a sporadic PD subtype. In various embodiments, the third subtype comprises a GBA subtype. In various embodiments, the cell is one of a stem cell, partially differentiated cell, or terminally differentiated cell. In various embodiments, the cell is a somatic cell. In various embodiments, the somatic cell is a fibroblast or a peripheral blood mononuclear cell (PBMC). In various embodiments, the cell is obtained from a subject through a tissue biopsy. In various embodiments, the tissue biopsy is obtained from an extremity of the subject.

In various embodiments, the predictive model is trained by: capture one or more images of a cell of the known neurodegenerative disease state; and using the one or more images of the cell of the known neurodegenerative disease state to train the predictive model to distinguish between morphological profiles of cells of different diseased states. In various embodiments, the known neurodegenerative disease state of the cell serves as a reference ground truth for training the predictive model. In various embodiments, the non-transitory computer readable medium disclosed herein, further comprise instructions that, when executed by a processor, cause the processor to: prior to capture the one or more images of the cell, having stained the cell using one or more fluorescent dyes. In various embodiments, the one or more fluorescent dyes are Cell Paint dyes for staining one or more of a cell nucleus, cell nucleoli, plasma membrane, cytoplasmic RNA, endoplasmic reticulum, actin, Golgi apparatus, and mitochondria. In various embodiments, each of the one or more images correspond to a fluorescent channel. In various embodiments, the steps of obtaining the cell and capturing the one or more images of the cell are performed in a high-throughput format using an automated array. In various embodiments, the instructions that cause the processor to analyze the one or more images using a predictive model further comprises instructions that, when executed by the processor, cause the processor to: divide the one or more images into a plurality of tiles; and analyze the plurality of tiles using the predictive model on a per-tile basis. In various embodiments, one or more tiles in the plurality of tiles each comprise a single cell.

BRIEF DESCRIPTION OF THE SEVERAL VIEWS OF THE DRAWINGS

These and other features, aspects, and advantages of the present invention will become better understood with regard to the following description, and accompanying drawings, where.

DETAILED DESCRIPTION

Definitions

Figure 1:
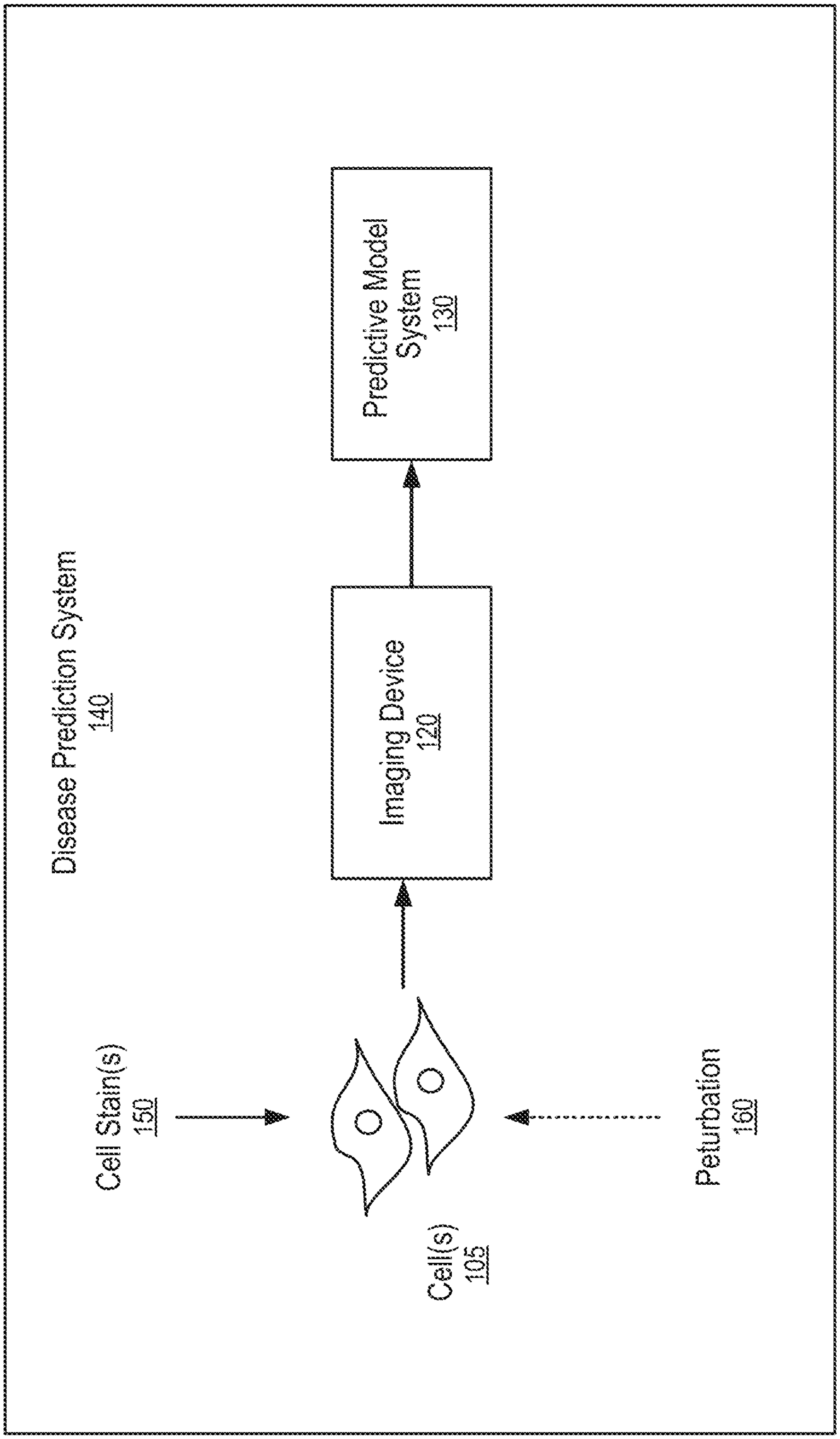
FIG. 1 shows a schematic disease prediction system for implementing a disease analysis pipeline, in accordance with an embodiment.

Terms used in the claims and specification are defined as set forth below unless otherwise specified.

As used in the specification and the appended claims, the singular forms "a," "an" and "the" include plural referents unless the context clearly dictates otherwise.

The term "subject" encompasses a cell, tissue, or organism, human or non-human, whether male or female. In some embodiments, the term "subject" refers to a donor of a cell, such as a mammalian donor of more specifically a cell or a human donor of a cell.

The term "mammal" encompasses both humans and non-humans and includes but is not limited to humans, non-human primates, canines, felines, murines, bovines, equines, and porcines.

The phrase "morphological profile" refers to values of imaging features or a transformed representation of images that define a disease state of a cell. In various embodiments, a morphological profile of a cell includes cell features (e.g., cell morphological features) including cellular shape and size as well as cell characteristics such as organelles including cell nucleus, cell nucleoli, plasma membrane, cytoplasmic RNA, endoplasmic reticulum, actin, Golgi apparatus, and mitochondria. In various embodiments, values of cell features are extracted from images of cells that have been labeled using fluorescently labeled biomarkers. Other cell features include object-neighbors features, mass features, intensity features, quality features, texture features, and global features (e.g., cell counts, cell distances). In various embodiments, a morphological profile of a cell includes values of non-cell features such as information about a well that the cell resides within (e.g., well density, background versus signal, percent of touching cells in the well). In various embodiments, a morphological profile of a cell includes values of both cell features and non-cell features. In various embodiments, a morphological profile comprises a deep embedding vector extracted from a deep learning neural network that transforms values of images. For example, the morphological profile may be extracted from a penultimate layer of a deep learning neural network that analyzes images of cells.

The phrase "predictive model" refers to a machine learned model that distinguishes between morphological profiles of cells of different disease states. Generally, a predictive model predicts the disease state of the cell based on the image features of a cell. In various embodiments, image features of the cell can be extracted from one or more images of the cell. In various embodiments, features of the cell can be structured as a deep embedding vector and are extracted from images via a deep learning neural network.

The phrase "obtaining a cell" encompasses obtaining a cell from a sample. The phrase also encompasses receiving a cell (e.g., from a third party).

The phrase "disease state" refers to a state of a cell. In various embodiments, the disease state refers to one of a presence or absence of a disease. In various embodiments, the disease state refers to a subtype of a disease. In particular embodiments, the disease is a neurodegenerative disease. For example, in the context of Parkinson's disease (PD), disease state refers to a presence or absence of PD. As another example, in the context of Parkinson's disease, the disease state refers to one of a LRRK2 subtype, a GBA subtype, or a sporadic subtype.

Overview

In various embodiments, disclosed herein are methods and systems for performing high-throughput analysis of cells using a disease analysis pipeline that determines predicted disease states of cells by implementing a predictive model trained to distinguish between morphological profiles of cells of different disease states. In particular embodiments, the disease analysis pipeline determines predicted neurodegenerative cellular disease states by implementing a predictive model trained to distinguish between morphological profiles of cells of the different neurodegenerative disease states. Furthermore, a predictive model disclosed herein is useful for performing high-throughput drug screens, thereby enabling the identification of modifiers of disease states. Thus, modifiers of disease states (e.g., neurodegenerative disease states) identified using the predictive model can be implemented for therapeutic applications (e.g., by reverting a cell exhibiting a diseased state morphology towards a cell exhibiting a non-diseased state morphology).

FIG. 1 shows an overall disease prediction system for implementing a disease analysis pipeline, in accordance with an embodiment. Generally, the disease prediction system 140 includes one or more cells 105 that are to be analyzed. In various embodiments, the one or more cells 105 are obtained from a single donor. In various embodiments, the one or more cells 105 are obtained from multiple donors. In various embodiments, the one or more cells 105 are obtained from at least 5 donors. In various embodiments, the one or more cells 105 are obtained from at least 10 donors, at least 20 donors, at least 30 donors, at least 40 donors, at least 50 donors, at least 75 donors, at least 100 donors, at least 200 donors, at least 300 donors, at least 400 donors, at least 500 donors, or at least 1000 donors.

In various embodiments, the cells 105 undergo a protocol for one or more cell stains 150. For example, cell stains 150 can be fluorescent stains for specific biomarkers of interest in the cells 105 (e.g., biomarkers of interest that can be informative for determining disease states of the cells 105). In various embodiments, the cells 105 can be exposed to a perturbation 160. Such a perturbation may have an effect on the disease state of the cell. In other embodiments, a perturbation 160 need not be applied to the cells 105, as is indicated by the dotted line in FIG. 1.

The disease prediction system 140 includes an imaging device 120 that captures one or more images of the cells 105. The predictive model system 130 analyzes the one or more captured images of the cells 105. In various embodiments, the predictive model system 130 analyzes one or more captured images of multiple cells 105 and predicts the disease states of the multiple cells 105. In various embodiments, the predictive model system 130 analyzes one or more captured images of a single cell to predict the disease state of the single cell.

In various embodiments, the predictive model system 130 analyzes one or more captured images of the cells 105, where different images are captured using different imaging channels. Therefore, different images include signal intensity indicating presence/absence of cell stains 150. Thus, the predictive model system 130 determines and selects cell stains that are informative for predicting the disease state of the cells 105.

In various embodiments, the predictive model system 130 analyzes one or more captured images of the cells 105, where the cells 105 have been exposed to a perturbation 160. Thus, the predictive model system 130 can determine the effects imparted by the perturbation 160. As one example, the predictive model system 130 can analyze a first set of images of cells captured before exposure to a perturbation 160 and a second set of images of the same cells captured after exposure to the perturbation 160. Thus, the change in the disease state prior to and subsequent to exposure to the perturbation 160 can represent the effects of the perturbation 160. For example, the cell may exhibit a disease state prior to exposure to the perturbation. If subsequent to exposure, the cell exhibits a morphological profile that is more similar to a non-diseased state, the perturbation 160 can be characterized as having a therapeutic effect that reverts the cell towards a healthier morphological profile and away from a diseased morphological profile.

Altogether, the disease prediction system 140 prepares cells 105 (e.g., exposes cells 105 to cell stains 150 and/or perturbation 160), captures images of the cells 105 using the imaging device 120, and predicts disease states of the cells 105 using the predictive model system 130. In various embodiments, the disease prediction system 140 is a high-throughput system that processes cells 105 in a high-throughput manner such that large populations of cells are rapidly prepared and analyzed to predict cellular disease states. The imaging device 120 may, through automated means, prepare cells (e.g., seed, culture, and/or treat cells), capture images from the cells 105, and provide the captured images to the predictive model system 130 for analysis. Additional description regarding the automated hardware and processes for handling cells are described herein. Further description regarding automated hardware and processes for handling cells are described in Paull, D., et al. Automated, high-throughput derivation, characterization and differentiation of induced pluripotent stem cells. *Nat Methods* 12, 885-892 (2015), which is incorporated by reference in its entirety.

Predictive Model System

Generally, the predictive model system (e.g., predictive model system 130 described in FIG. 1) analyzes one or more images including cells that are captured by the imaging device 120. In various embodiments, the predictive model system analyzes images of cells for training a predictive model. In various embodiments, the predictive model system analyzes images of cells for deploying a predictive model to predict disease states of a cell in the images. In various embodiments, the predictive model system and/or predictive models analyze captured images by at least analyzing values of features of the images (e.g., by extracting values of the features from the images or by deploying a neural network that extracts features from the images in the form of a deep embedding vector).

In various embodiments, the images include fluorescent intensities of dyes that were previously used to stain certain components or aspects of the cells. In various embodiments, the images may have undergone Cell Paint staining and therefore, the images include fluorescent intensities of Cell Paint dyes that label cellular components (e.g., one or more of cell nucleus, cell nucleoli, plasma membrane, cytoplasmic RNA, endoplasmic reticulum, actin, Golgi apparatus, and mitochondria). Cell Paint is described in further detail in Bray et al., Cell Painting, a high-content image-based assay for morphological profiling using multiplexed fluorescent dyes. Nat. Protoc. 2016 September; 11(9): 1757-1774 as well as Schiff, L. et al., Deep Learning and automated Cell Painting reveal Parkinson's disease-specific signatures in primary patient fibroblasts, bioRxiv 2020.11.13.380576, each of which is hereby incorporated by reference in its entirety. In various embodiments, each image corresponds to a particular fluorescent channel (e.g., a fluorescent channel corresponding to a range of wavelengths). Therefore, each image can include fluorescent intensities arising from a single fluorescent dye with limited effect from other fluorescent dyes.

In various embodiments, prior to feeding the images to the predictive model (e.g., either for training the predictive model or for deploying the predictive model), the predictive model system performs image processing steps on the one or more images. Generally, the image processing steps are useful for ensuring that the predictive model can appropriately analyze the processed images. As one example, the predictive model system can perform a correction or a normalization over one or more images. For example, the predictive model system can perform a correction or normalization across one or more images to ensure that the images are comparable to one another. This ensures that extraneous factors do not negatively impact the training or deployment of the predictive model. An example correction can be a flatfield image correction. Another example correction can be an illumination correction which corrects for heterogeneities in the images that may arise from biases arising from the imaging device 120. Further description of illumination correction in Cell Paint images is described in Bray et al., Cell Painting, a high-content image-based assay for morphological profiling using multiplexed fluorescent dyes. Nat. Protoc. 2016 September; 11(9): 1757-1774, which is hereby incorporated by reference in its entirety.

In various embodiments, the image processing steps involve performing an image segmentation. For example, if an image includes multiple cells, the predictive model system performs an image segmentation such that resulting images each include a single cell. For example, if a raw image includes Y cells, the predictive model system may segment the image into Y different processed images, where each resulting image includes a single cell. In various embodiments, the predictive model system implements a nuclei segmentation algorithm to segment the images. Thus, a predictive model can subsequently analyze the processed images on a per-cell basis.

Generally, in analyzing one or more images, the predictive model analyzes values of features of the images. In various embodiments, the predictive model analyzes image features which can be extracted from the one or more images. For example, such image features can be extracted from the one or more images using a feature extraction algorithm. Image features can include: cell features (e.g., cell morphological features) including cellular shape and size as well as cell characteristics such as organelles including cell nucleus, cell nucleoli, plasma membrane, cytoplasmic RNA, endoplasmic reticulum, actin, Golgi apparatus, and mitochondria. In various embodiments, values of cell features can be extracted from images of cells that have been labeled using fluorescently labeled biomarkers. Other cell features include colocalization features, radial distribution features, granularity features, object-neighbors features, mass features, intensity features, quality features, texture features, and global features. In various embodiments, image features include non-cell features such as information about a well that the cell resides within (e.g., well density, background versus signal, percent of touching cells in the well). In various embodiments, image features include CellProfiler features, examples of which are described in further detail in Carpenter, A. E., et al. CellProfiler: image analysis software for identifying and quantifying cell phenotypes. *Genome Biol* 7, R100 (2006), which is incorporated by reference in its entirety. In various embodiments, the values of features of the images are a part of a morphological profile of the cell. In various embodiments, to determine a predicted disease state of the cell, the predictive model compares the morphological profile of the cell (e.g., values of features of the images) extracted from an image to values of features for morphological profiles of other cells of known disease state (e.g., other cells of known disease state that were used during training of the predictive model). Further description of morphological profiles of cells is described herein.

In various embodiments, a neural network is employed that analyzes the images and extracts relevant feature values. For example, the neural network receives the images as input and identifies relevant features. In various embodiments, the relevant identified by the neural network represent non-interpretable features that represent sophisticated features that are not readily interpretable. In such embodiments, the features identified by the neural network can be structured as a deep embedding vector, which is a transformed representation of the images. Values of these features identified by the neural network can be provided to the predictive model for analysis.

In various embodiments, a morphological profile is composed of at least 2 features, at least 3 features, at least 4 features, at least 5 features, at least 10 features, at least 20 features, at least 30 features, at least 40 features, at least 50 features, at least 75 features, at least 100 features, at least 200 features, at least 300 features, at least 400 features, at least 500 features, at least 600 features, at least 700 features, at least 800 features, at least 900 features, at least 1000 features, at least 1100 features, at least 1200 features, at least 1300 features, at least 1400 features, or at least 1500 features. In particular embodiments, a morphological profile is composed of at least 1000 features. In particular embodiments, a morphological profile is composed of at least 1100 features. In particular embodiments, a morphological profile is composed of at least 1200 features. In particular embodiments, a morphological profile is composed of 1200 features.

Figure 2A:
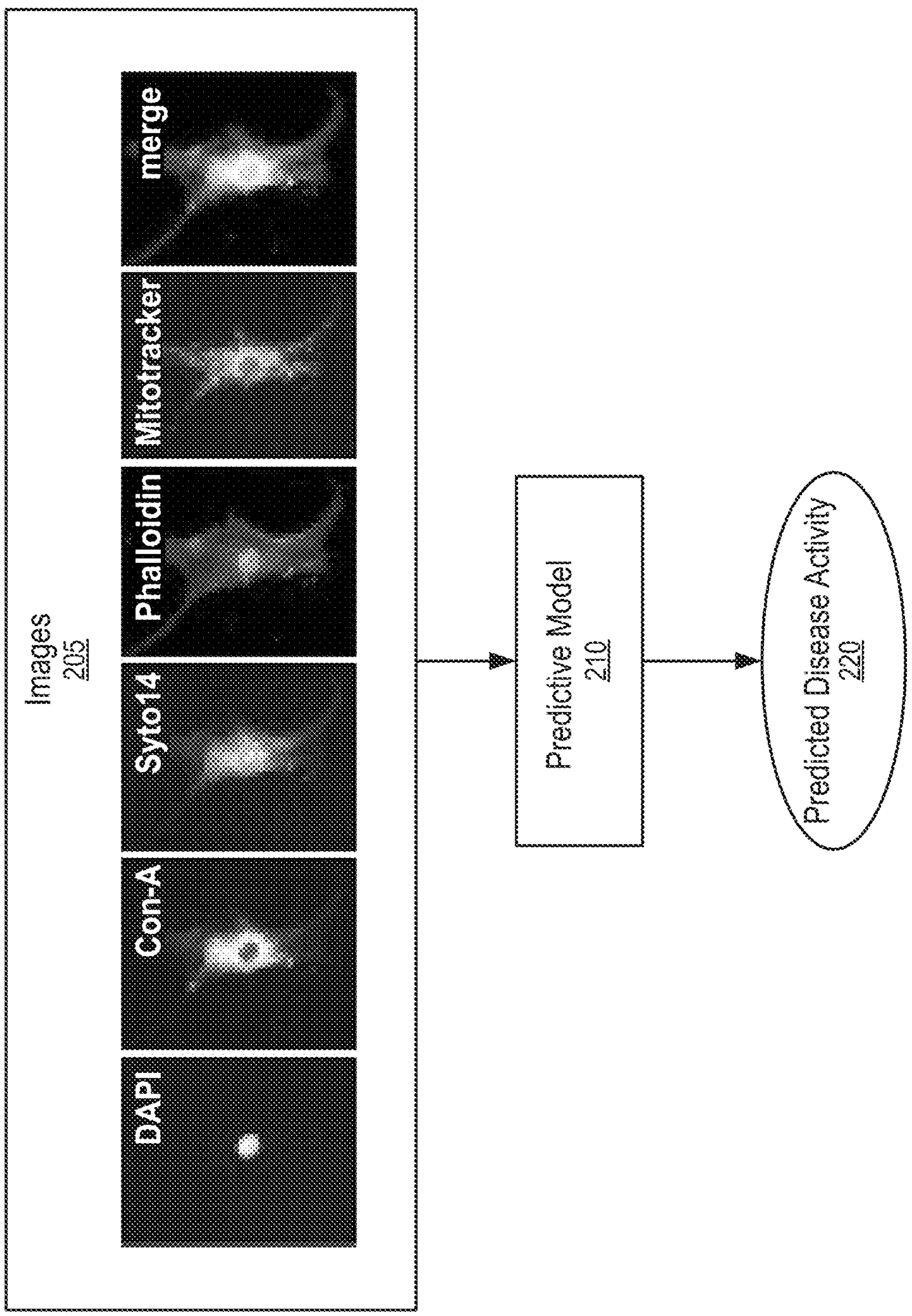
FIG. 2A is an example block diagram depicting the deployment of a predictive model, in accordance with an embodiment.

In various embodiments, the predictive model analyzes multiple images or features of the multiple images of a cell across different channels that have fluorescent intensities for different fluorescent dyes. Reference is now made to FIG. 2A, which is a block diagram that depicts the deployment of the predictive model, in accordance with an embodiment. FIG. 2A shows the multiple images 205 of a single cell. Here, each image 205 corresponds to a particular channel (e.g., fluorescent channel) which depicts fluorescent intensity for a fluorescent dye that has stained a marker of the cell. For example, as shown in FIG. 2A, a first image includes fluorescent intensity from a DAPI stain which shows the cell nucleus. A second image includes fluorescent intensity from a concanavalin A (Con-A) stain which shows the cell surface. A third image includes fluorescent intensity from a Syto14 stain which shows nucleic acids of the cell. A fourth image includes fluorescent intensity from a Phalloidin stain which shows actin filament of the cell. A fifth image includes fluorescent intensity from a Mitotracker stain which shows mitochondria of the cell. A sixth image includes the merged fluorescent intensities across the other images. Although FIG. 2A depicts six images with particular fluorescent dyes (e.g., images 205), in various embodiments, additional or fewer images with same or different fluorescent dyes may be employed. For example, additional or alternative stains can include any of Alexa Fluor® 488 Conjugate (Invitrogen™ C11252), Alexa Fluor® 568 Phalloidin (Invitrogen™ A12380), Hoechst 33342 trihydrochloride, trihydrate (Invitrogen™ H3570), Molecular Probes Wheat Germ Agglutinin, or Alexa Fluor 555 Conjugate (Invitrogen™ W32464).

As shown in FIG. 2A, the multiple images 205 can be provided as input to a predictive model 210. In various embodiments, a feature extraction process is performed on the multiple images 205 and the values of the extracted features are provided as input to the predictive model 210. In various embodiments, a feature extraction process involves implementing a deep learning neural network to generate deep embeddings that can be provided as input to the predictive model 210. The predictive model 210 determines a predicted disease state 220 for the cell in the images 205. The process can be repeated for other sets of images corresponding to other cells such that the predictive model 210 analyzes each other set of images to predict the disease states of the other cells. In various embodiments, the predictive model 210 predicts a disease state of a neurodegenerative disease. In particular embodiments, the neurodegenerative disease is Parkinson's disease (PD). Thus, the predictive model 210 may predict a presence or absence of PD. As another example, the predictive model 210 may predict a presence of a subtype of PD, such as a LRRK2 subtype, a GBA subtype, or a sporadic subtype.

In various embodiments, the predicted disease state 220 of the cell can be compared to a previous disease state of the cell. For example, the cell may have previously undergone a perturbation (e.g., by exposing to a drug), which may have had an effect on the disease state of the cell. Prior to the perturbation, the cell may have a previous disease state. Thus, the previous disease state of the cell is compared to the predicted disease state 220 to determine the effects of the perturbation. This is useful for identifying perturbations that are modifiers of cellular disease state.

Predictive Model

Generally, the predictive model analyzes a morphological profile (e.g., features extracted from an image with one or more cells) of the one or more cells and outputs a prediction of the disease state of the one or more cells in the image. In various embodiments, the predictive model can be any one of a regression model (e.g., linear regression, logistic regression, or polynomial regression), decision tree, random forest, support vector machine, Naïve Bayes model, k-means cluster, or neural network (e.g., feed-forward networks, multilayer perceptron networks, convolutional neural networks (CNN), deep neural networks (DNN), autoencoder neural networks, generative adversarial networks, or recurrent networks (e.g., long short-term memory networks (LSTM), bi-directional recurrent networks, deep bi-directional recurrent networks). In various embodiments, the predictive model comprises a dimensionality reduction component for visualizing data, the dimensionality reduction component comprising any of a principal component analysis (PCA) component or a T-distributed Stochastic Neighbor Embedding (TSNe). In particular embodiments, the predictive model is a neural network. In particular embodiments, the predictive model is a random forest. In particular embodiments, the predictive model is a regression model.

In various embodiments, the predictive model includes one or more parameters, such as hyperparameters and/or model parameters. Hyperparameters are generally established prior to training. Examples of hyperparameters include the learning rate, depth or leaves of a decision tree, number of hidden layers in a deep neural network, number of clusters in a k-means cluster, penalty in a regression model, and a regularization parameter associated with a cost function. Model parameters are generally adjusted during training. Examples of model parameters include weights associated with nodes in layers of neural network, variables and threshold for splitting nodes in a random forest, support vectors in a support vector machine, and coefficients in a regression model. The model parameters of the predictive model are trained (e.g., adjusted) using the training data to improve the predictive power of the predictive model.

In various embodiments, the predictive model outputs a classification of a disease state of a cell. In various embodiments, the predictive model outputs one of two possible classifications of a disease state of a cell. For example, the predictive model classifies the cell as either having a presence of a disease or absence of a disease (e.g., neurodegenerative disease). As another example, the predictive model classifies the cell in one of multiple possible subtypes of a disease (e.g., neurodegenerative disease). For example, the predictive model may classify the cell in one of at least 2, at least 3, at least 4, at least 5, at least 6, at least 7, at least 8, at least 9, or at least 10 different subtypes. In particular embodiments, the predictive model classifies the cell in one of two possible subtypes of a disease. In the context of Parkinson's Disease, the predictive model may classify the cell in one of either a LRRK2 subtype or a sporadic PD subtype.

In various embodiments, the predictive model outputs one of three possible classifications of a disease state of a cell. For example, the predictive model classifies the cell in one of three possible subtypes of a disease (e.g., neurodegenerative disease). In the context of Parkinson's Disease, the predictive model may classify the cell in one of any of a LRRK2 subtype, a GBA subtype, or a sporadic PD subtype.

The predictive model can be trained using a machine learning implemented method, such as any one of a linear regression algorithm, logistic regression algorithm, decision tree algorithm, support vector machine classification, Naïve Bayes classification, K-Nearest Neighbor classification, random forest algorithm, deep learning algorithm, gradient boosting algorithm, gradient descent, and dimensionality reduction techniques such as manifold learning, principal component analysis, factor analysis, autoencoder regularization, and independent component analysis, or combinations thereof. In particular embodiments, the predictive model is trained using a deep learning algorithm. In particular embodiments, the predictive model is trained using a random forest algorithm. In particular embodiments, the predictive model is trained using a linear regression algorithm. In various embodiments, the predictive model is trained using supervised learning algorithms, unsupervised learning algorithms, semi-supervised learning algorithms (e.g., partial supervision), weak supervision, transfer, multi-task learning, or any combination thereof. In particular embodiments, the predictive model is trained using a weak supervision learning algorithm.

In various embodiments, the predictive model is trained to improve its ability to predict the disease state of a cell using training data that include reference ground truth values. For example, a reference ground truth value can be a known disease state of a cell. In a training iteration, the predictive model analyzes images acquired from the cell and determines a predicted disease state of the cell. The predicted disease state of the cell can be compared against the reference ground truth value (e.g., known disease state of the cell) and the predictive model is tuned to improve the prediction accuracy. For example, the parameters of the predictive model are adjusted such that the predictive model's prediction of the disease state of the cell is improved. In particular embodiments, the predictive model is a neural network and therefore, the weights associated with nodes in one or more layers of the neural network are adjusted to improve the accuracy of the predictive model's predictions. In various embodiments, the parameters of the neural network are trained using backpropagation to minimize a loss function. Altogether, over numerous training iterations across different cells, the predictive model is trained to improve its prediction of cellular disease states across the different cells.

In various embodiments, the predictive model is trained on features of images acquired from cells of known disease state. Here, features may be imaging features such as cell features and/or non-cell features. In various embodiments, features may be organized as a deep embedding vector. For example, a deep neural network can be employed that analyzes images to determine a deep embedding vector (e.g., a morphological profile). An example of such a deep neural network is described above in reference to FIG. 2B. Here, at each training iteration, the predictive model is trained to predict the disease state using the deep embedding vector (e.g., a morphological profile).

In various embodiments, a trained predictive model includes a plurality of morphological profiles that define cells of different disease states. In various embodiments, a morphological profile for a cell of a particular disease state refers to a combination of values of features that define the cell of the particular disease state. For example, a morphological profile for a cell of a particular disease state may be a feature vector including values of features that are informative for defining the cell of the particular disease state. Thus, a second morphological profile for a cell of a different disease state can be a second feature vector including different values of the features that are informative for defining the cell of the different disease state.

In various embodiments, a morphological profile of a cell includes image features that are extracted from one or more images of the cell. Image features can include cell features (e.g., cell morphological features) including cellular shape and size as well as cell characteristics such as organelles including cell nucleus, cell nucleoli, plasma membrane, cytoplasmic RNA, endoplasmic reticulum, actin, Golgi apparatus, and mitochondria. In various embodiments, values of cell features can be extracted from images of cells that have been labeled using fluorescently labeled biomarkers. Other cell features include object-neighbors features, mass features, intensity features, quality features, texture features, and global features. In various embodiments, image features include non-cell features such as information about a well that the cell resides within (e.g., well density, background versus signal, percent of touching cells in the well).

In various embodiments, a morphological profile for a cell can include non-interpretable features that are determined using a neural network. Here, the morphological profile can be a representation of the images from which the non-interpretable features were derived. In various embodiments, in addition to non-interpretable features, the morphological profile can also include imaging features (e.g., cell features or non-cell features). For example, the morphological profile may be a vector including both non-interpretable features and image features. In various embodiments, the morphological profile may be a vector including CellProfiler features.

In various embodiments, a morphological profile for a cell can be developed using a deep learning neural network comprised of multiple layers of nodes. The morphological profile can be an embedding derived from a layer of the deep learning neural network that is a transformed representation of the images. In various embodiments, the morphological profile is extracted from a layer of the neural network. As one example, the morphological profile for a cell can be extracted from the penultimate layer of the neural network. As one example, the morphological profile for a cell can be extracted from the third to last layer of the neural network. In this context, the transformed representation refers to values of the images that have at least undergone transformations through the preceding layers of the neural network. Thus, the morphological profile can be a transformed representation of one or more images. In various embodiments, an embedding is a dimensionally reduced representation of values in a layer. Thus, an embedding can be used comparatively by calculating the Euclidean distance between the embedding and other embeddings of cells of known disease states as a measure of phenotypic distance.

In various embodiments, the morphological profile is a deep embedding vector with X elements. In various embodiments, the deep embedding vector includes 64 elements. In various embodiments, the morphological profile is a deep embedding vector concatenated across multiple vectors to yield X elements. For example, given 5 image channels (e.g., image channels of DAPI, Con-A, Syto14, Phalloidin, and Mitotracker), the deep embedding vector can be a concatenation of vectors from the 5 image channels. Given 64 elements for each image channel, the deep embedding vector can be a 320-dimensional vector representing the concatenation of the 5 separate 64 element vectors.

Figure 2B:
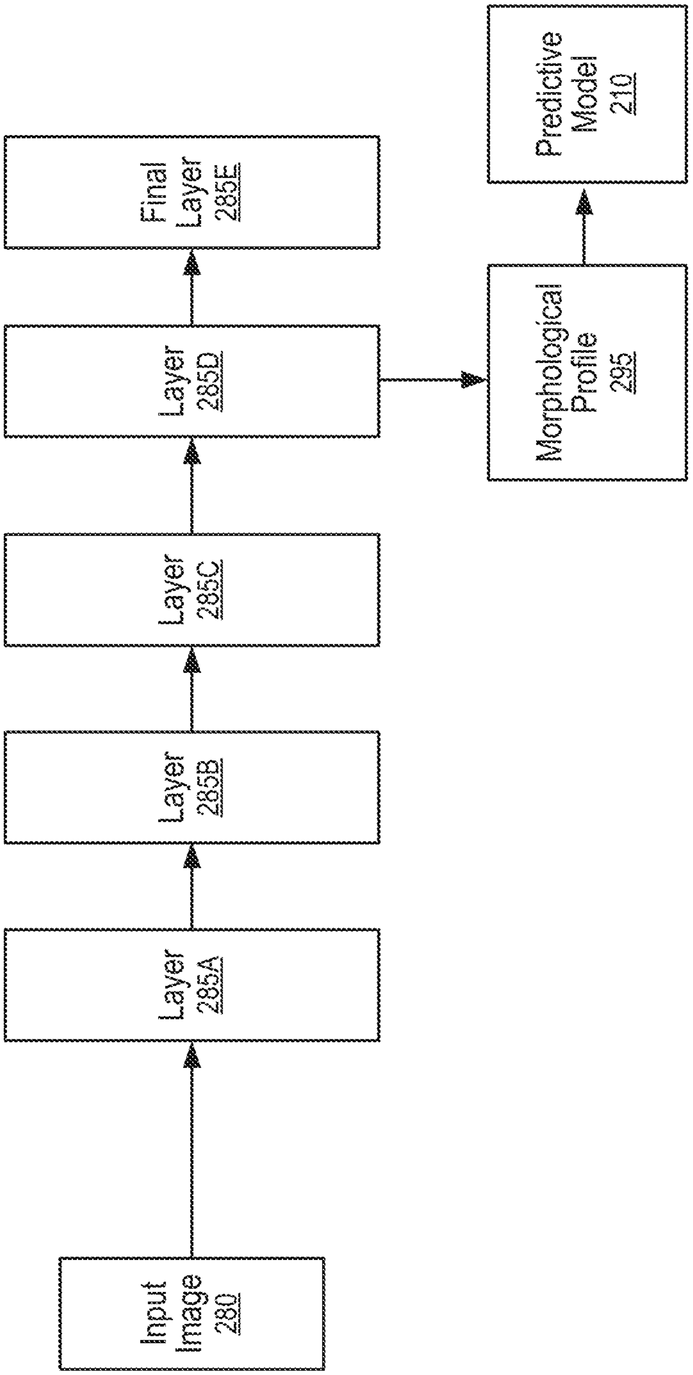
FIG. 2B is an example structure of a deep learning neural network for determining morphological profiles, in accordance with an embodiment.

Reference is now made to FIG. 2B, which depicts an example structure of a deep learning neural network 275 for determining morphological profiles, in accordance with an embodiment. Here, the input image 280 is provided as input to a first layer 285A of the neural network. For example, the input image 280 can be structured as an input vector and provided to nodes of the first layer 285A. The first layer 285A transforms the input values and propagates the values through the subsequent layers 285B, 285C, and 285D. The deep learning neural network 275 may terminate in a final layer 285E. In various embodiments, the layer 285D can represent the morphological profile 295 of the cell and can be a transformed representation of the input image 280. In this scenario, the morphological profile 295 can be composed of non-interpretable features that include sophisticated features determined by the neural network. As shown in FIG. 2B, the morphological profile 295 can be provided to the predictive model 210. In various embodiments, the predictive model 210 may compare the morphological profile 295 of the cell to morphological profiles of cells of known disease states. For example, if the morphological profile 295 of the cell is similar to a morphological profile of a cell of a known disease state, then the predictive model 210 can predict that the state of the cell is also of the known disease state.

Put more generally, in predicting the disease state of a cell, the predictive model can compare the values of features of the cell (or a transformed representation of images of the cell) to values of features (or a transformed representation of images of the cell) of one or more morphological profiles of cells of known disease state. For example, if the values of features (or transformed representation of images of the cell) of the cell are closer to values of features (or transformed representation of images) of a first morphological profile in comparison to values of features (or a transformed representation of images) of a second morphological profile, the predictive model can predict that the disease state of the cell is the disease state corresponding to the first morphological profile.

Methods for Determining Cellular Disease State

Figure 3:
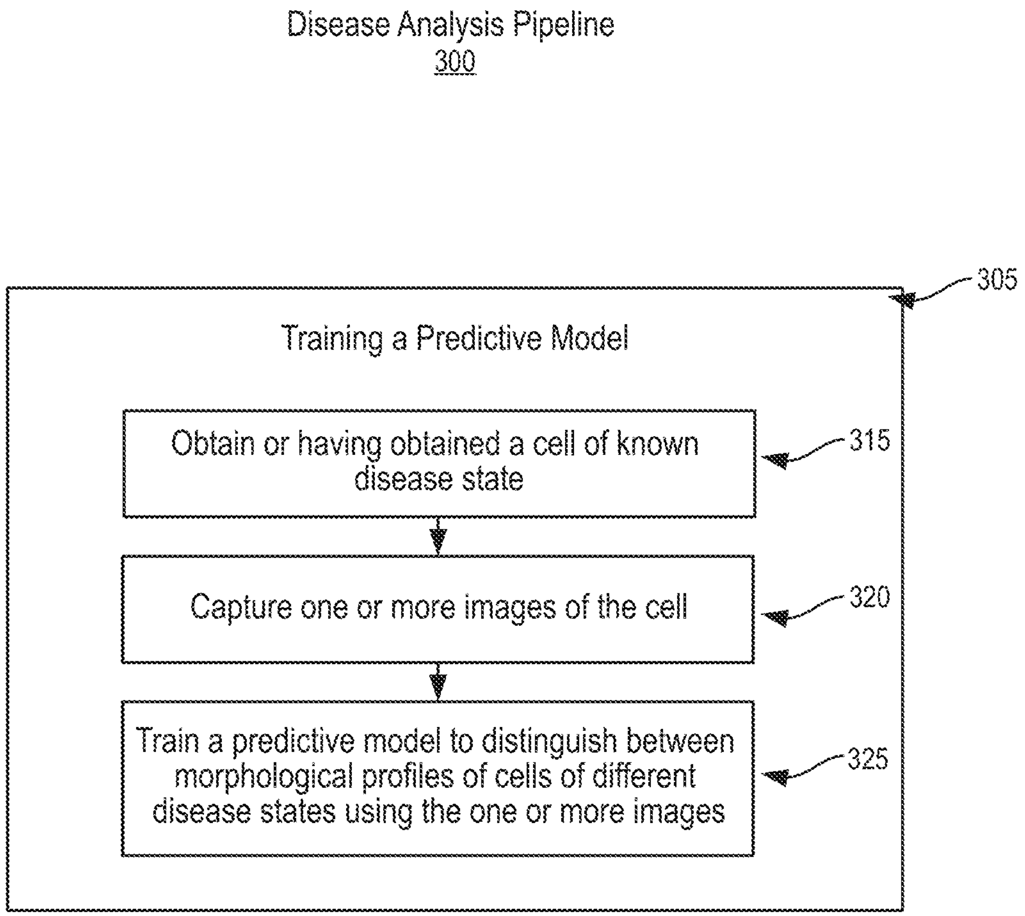
FIG. 3 is a flow process for training a predictive model for the disease analysis pipeline, in accordance with an embodiment.

Methods disclosed herein describe the disease analysis pipeline. FIG. 3 is a flow process for training a predictive model for the disease analysis pipeline, in accordance with an embodiment. Furthermore, FIG. 4 is a flow process for deploying a predictive model for the disease analysis pipeline, in accordance with an embodiment.

Figure 4:
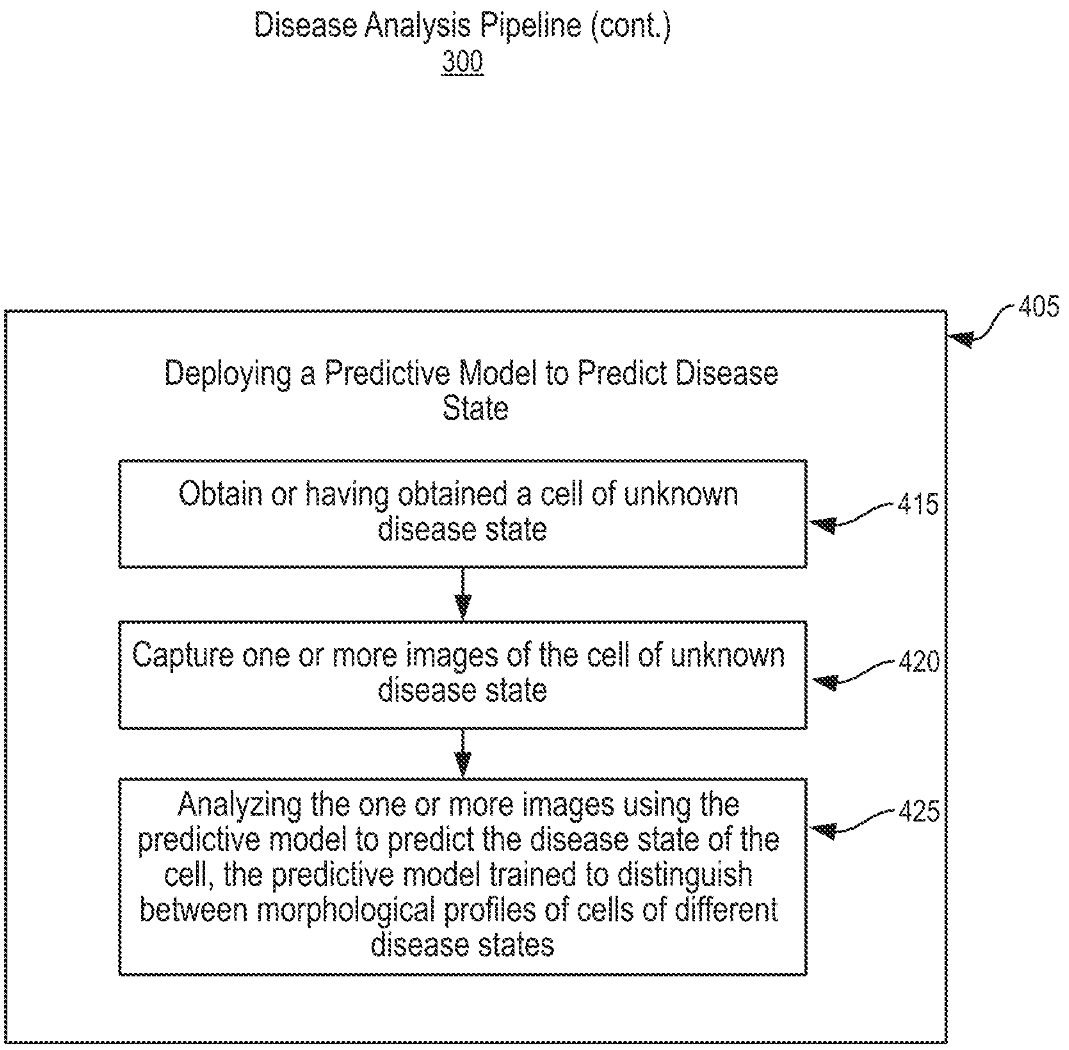
FIG. 4 is a flow process for deploying a predictive model for the disease analysis pipeline, in accordance with an embodiment.

Generally, the disease analysis pipeline 300 refers to the deployment of a predictive model for predicting the disease state of a cell, as is shown in FIG. 4. In various embodiments, the disease analysis pipeline 300 further refers to the training of a predictive model as is shown in FIG. 3. Thus, although the description below may refer to the disease analysis pipeline as incorporating both the training and deployment of the predictive model, in various embodiments, the disease analysis pipeline 300 only refers to the deployment of a previously trained predictive model.

Referring first to FIG. 3, at step 305, the predictive model is trained. Here, the training of the predictive model includes steps 315, 320, and 325. Step 315 involves obtaining or having obtained a cell of known cellular disease state. For example, the cell may have been obtained from a subject of a known disease state. Step 320 involves capturing one or more images of the cell. As an example, the cell may have been stained (e.g., with Cell Paint stains) and therefore, the different images of the cell correspond to different fluorescent channels that include fluorescent intensity indicating the cell nuclei, nucleic acids, endoplasmic reticulum, actin/Golgi/plasma membrane, and mitochondria.

Step 325 involves training a predictive model to distinguish between morphological profiles of cells of different disease states using the one or more images. In various embodiments, the predictive model learns morphological profiles of cells of different diseased states. For example, the morphological profile may include extracted imaging features that enable the predictive model to differentiate between cells of different diseased states. In various embodiments, a feature extraction process can be performed on the one or more images of the cell. Thus, extracted features can be included in the morphological profile of the cell. As another example, the morphological profile may comprise a transformed representation of the one or more images. Here, the morphological profile may be a deep embedding vector that includes non-interpretable features derived by a neural network. Given the reference ground truth value for the cell (e.g., the known disease state), the predictive model is trained to improve its prediction of the disease state of the cell.

Referring now to FIG. 4, at step 405, a trained predictive model is deployed to predict the cellular disease state of a cell. Here, the deployment of the predictive model includes steps 415, 420, and 425. Step 415 involves obtaining or having obtained a cell of an unknown disease state. As one example, the cell may be derived from a subject and therefore, is evaluated for the disease state for purposes of diagnosing the subject with a disease. As another example, the cell may have been perturbed (e.g., perturbed using a small molecule drug), and therefore, the perturbation caused the cell to alter its morphological behavior corresponding to a different disease state. Thus, the predictive model is deployed to determine whether the disease state of the cell has changed due to the perturbation.

Step 420 involves capturing one or more images of the cell of unknown disease state. As an example, the cell may have been stained (e.g., with Cell Paint stains) and therefore, the different images of the cell correspond to different fluorescent channels that include fluorescent intensity indicating the cell nuclei, nucleic acids, endoplasmic reticulum, actin/Golgi/plasma membrane, and mitochondria.

Step 425 involves analyzing the one or more images using the predictive model to predict the disease state of the cell. Here, the predictive model was previously trained to distinguish between morphological profiles of cells of different disease states. Thus, in some embodiments, the predictive model predicts a disease state of the cell by comparing the morphological profile of the cell with morphological profiles of cells of known disease states.

Methods for Determining Modifiers of Cellular Disease State

Figure 5:
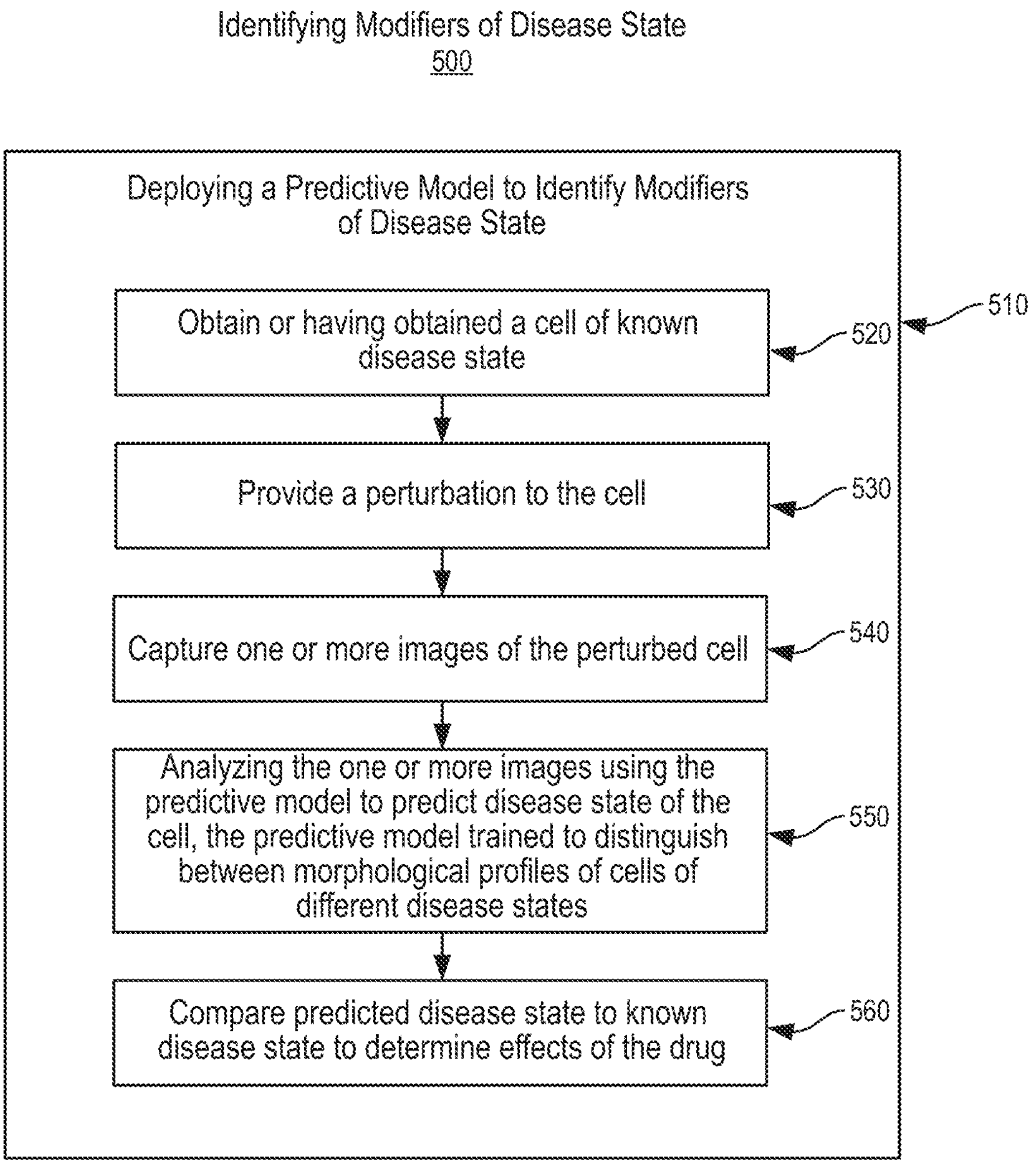
FIG. 5 is a flow process for identifying modifiers of disease state by deploying a predictive model, in accordance with an embodiment.

FIG. 5 is a flow process 500 for identifying modifiers of cellular disease state by deploying a predictive model, in accordance with an embodiment. For example, the predictive model may, in various embodiments, be trained using the flow process step 305 described in FIG. 3.

Here, step 510 of deploying a predictive model to identify modifiers of cellular disease state involves steps 520, 530, 540, 550, and 560. Step 520 involves obtaining or having obtained a cell of known disease state. For example, the cell may have been obtained from a subject of a known disease state. As another example, the cell may have been previously analyzed by deploying a predictive model (e.g., step 355 shown in FIG. 3B) which predicted a cellular disease state for the cell.

Step 530 involves providing a perturbation to the cell. For example, the perturbation can be provided to the cell within a well in a well plate (e.g., in a well of a 96 well plate). Here, the provided perturbation may have an effect on the disease state of the cell, which can be manifested by the cell as changes in the cell morphology. Thus, subsequent to providing the perturbation to the cell, the cellular disease state of the cell may no longer be known.

Step 540 involves capturing one or more images of the perturbed cell. As an example, the cell may have been stained (e.g., with Cell Paint stains) and therefore, the different images of the cell correspond to different fluorescent channels that include fluorescent intensity indicating the cell nuclei, nucleic acids, endoplasmic reticulum, actin/Golgi/plasma membrane, and mitochondria.

Step 550 involves analyzing the one or more images using the predictive model to predict the disease state of the perturbed cell. Here, the predictive model was previously trained to distinguish between morphological profiles of cells of different disease states. Thus, in some embodiments, the predictive model predicts a disease state of the cell by comparing the morphological profile of the cell with morphological profiles of cells of known disease states.

Step 560 involves comparing the predicted cellular disease state to the previous known disease state of the cell (e.g., prior to perturbation) to determine the effects of the drug on cellular disease state. For example, if the perturbation caused the cell to exhibit morphological changes that were predicted to be less of a disease state, the perturbation can be characterized as having therapeutic effect. As another example, if the perturbation caused the cell to exhibit morphological changes that were predicted to be a more diseased phenotype, the perturbation can be characterized as having a detrimental effect on the disease state.

Cells

In various embodiments, the cells (e.g., cells shown in FIG. 1) refer to a single cell. In various embodiments, the cells refer to a population of cells. In various embodiments, the cells refer to multiple populations of cells. The cells can vary in regard to the type of cells (single cell type, mixture of cell types), or culture type (e.g., in vitro 2D culture, in vitro 3D culture, or ex vivo). In various embodiments, the cells include one or more cell types. In various embodiments, the cells are a single cell population with a single cell type. In various embodiments, the cells are stem cells. In various embodiments, the cells are partially differentiated cells. In various embodiments, the cells are terminally differentiated cells. In various embodiments, the cells are somatic cells. In various embodiments, the cells are fibroblasts. In various embodiments, the cells are peripheral blood mononuclear cells (PBMCs). In various embodiments, the cells include one or more of stem cells, partially differentiated cells, terminally differentiated cells, somatic cells, or fibroblasts.

In various embodiments, the cells are obtained from a subject, such as a human subject. Therefore, the disease analysis pipeline described herein can be applied to determine disease states of the cells obtained from the subject. In various embodiments, the disease analysis pipeline can be used to diagnose the subject with a disease, or to classify the subject with having a particular subtype of the disease. In various embodiments, the cells are obtained from a sample that is obtained from a subject. An example of a sample can include an aliquot of body fluid, such as a blood sample, taken from a subject, by means including venipuncture, excretion, ejaculation, massage, biopsy, needle aspirate, lavage sample, scraping, surgical incision, or intervention or other means known in the art. As another example, a sample can include a tissue sample obtained via a tissue biopsy. In particular embodiments, a tissue biopsy can be obtained from an extremity of the subject (e.g., arm or leg of the subject).

In various embodiments, the cells are seeded and cultured in vitro in a well plate. In various embodiments, the cells are seeded and cultured in any one of a 6 well plate, 12 well plate, 24 well plate, 48 well plate, 96 well plate, 384 well plate, or 1536 well plates. In particular embodiments, the cells 105 are seeded and cultured in a 96 well plate. In various embodiments, the well plates can be clear bottom well plates that enables imaging (e.g., imaging of cell stains, e.g., cell stain 150 shown in FIG. 1).

Cell Stains

Generally, cells are treated with one or more cell stains or dyes (e.g., cell stains 150 shown in FIG. 1) for purposes of visualizing one or more aspects of cells that can be informative for determining the disease states of the cells. In particular embodiments, cell stains include fluorescent dyes, such as fluorescent antibody dyes that target biomarkers that represent known disease state hallmarks. In various embodiments, cells are treated with one fluorescent dye. In various embodiments, cells are treated with two fluorescent dyes. In various embodiments, cells are treated with three fluorescent dyes. In various embodiments, cells are treated with four fluorescent dyes. In various embodiments, cells are treated with five fluorescent dyes. In various embodiments, cells are treated with six fluorescent dyes. In various embodiments, the different fluorescent dyes used to treat cells are selected such that the fluorescent signal due to one dye minimally overlaps or does not overlap with the fluorescent signal of another dye. Thus, the fluorescent signals of multiple dyes can be imaged for a single cell.

In some embodiments, cells are treated with multiple antibody dyes, where the antibodies are specific for biomarkers that are located in different locations of the cell. For example, cells can be treated with a first antibody dye that binds to cytosolic markers and further treated with a second antibody dye that binds to nuclear markers. This enables separation of fluorescent signals arising from the multiple dyes by spatially localizing the signal from the differently located dyes.

In various embodiments, cells are treated with Cell Paint stains including stains for one or more of cell nuclei (e.g., DAPI stain), nucleoli and cytoplasmic RNA (e.g., RNA or nucleic acid stain), endoplasmic reticulum (ER stain), actin, Golgi and plasma membrane (AGP stain), and mitochondria (MITO stain). Additionally, detailed protocols of Cell Paint staining are further described in Schiff, L. et al., Deep Learning and automated Cell Painting reveal Parkinson's disease-specific signatures in primary patient fibroblasts, bioRxiv 2020.11.13.380576, which is hereby incorporated by reference in its entirety. Additional or alternative stains can include any of Alexa Fluor® 488 Conjugate (Invitrogen™ C11252), Alexa Fluor® 568 Phalloidin (Invitrogen™ A12380), Hoechst 33342 trihydrochloride, trihydrate (Invitrogen™ H3570), Molecular Probes Wheat Germ Agglutinin, or Alexa Fluor 555 Conjugate (Invitrogen™ W32464).

Diseases and Disease States

Embodiments disclosed herein involve performing high-throughput analysis of cells using a disease analysis pipeline that determines predicted disease states of cells by implementing a predictive model trained to distinguish between morphological profiles of cells of different disease states. In various embodiments, the disease states refer to a cellular state of a particular disease. In particular embodiments, the disease refers to a neurodegenerative disease.

Examples of neurodegenerative diseases include any of Parkinson's Disease (PD), Alzheimer's Disease, Amyotrophic Lateral Sclerosis (ALS), Infantile Neuroaxonal Dystrophy (INAD), Multiple Sclerosis (MS), Amyotrophic Lateral Sclerosis (ALS), Batten Disease, Charcot-Marie-Tooth Disease (CMT), Autism, post traumatic stress disorder (PTSD), schizophrenia, frontotemporal dementia (FTD), multiple system atrophy (MSA), or a synucleinopathy.

In various embodiments, the disease state refers to one of a presence or absence of a disease. For example, in the context of Parkinson's disease (PD), the disease state refers to a presence or absence of PD. In various embodiments, the disease state refers to a subtype of a disease. For example, in the context of Parkinson's disease, the disease state refers to one of a LRRK2 subtype, a GBA subtype, or a sporadic subtype. For example, in the context of Charcot-Marie-Tooth Disease (CMT), the disease state refers to one of a CMT1A subtype, CMT2B subtype, CMT4C subtype, or CMTX1 subtype.

Perturbations

One or more perturbations (e.g., perturbation 160 shown in FIG. 1) can be provided to cells. In various embodiments, a perturbation can be a small molecule drug from a library of small molecule drugs. In various embodiments, a perturbation is a drug or compound that is known to have disease-state modifying effects, examples of which include Levodopa based drugs, Carbidopa based drugs, dopamine agonists, catechol-O-methyltransferase (COMT) inhibitors, monoamine oxidase (MAO) inhibitors, Rho-kinase inhibitors, A2A receptor antagonists, dyskinesia treatments, anti-cholinergics, and acetylocholinesterase inhibitors, which have been shown to have anti-aging effects. Examples of dopamine agonists include pramipexole (MIRAPEX), Ropinirole (REQUIP), Rotigotine (NEUPRO), apomorphine HCl (KYNMOBI). Examples of COMT inhibitors include Opicapone (ONGENTYS), Entacapone (COMTAN), and Tolcapone (TASMAR). Examples of MAO inhibitors include selegiline (ELDEPRYL or ZELAPAR), Rasagiline (AZILECT or AZIPRON), and safinamide (XADAGO). An example of a Rho-kinase inhibitor includes Fasudil. An example of A2A receptor antagonists include Istradefylline (NOURIANZ). Examples of dyskinesia treatments include Amantadine ER (GOCOVRI, SYMADINE, or SYMMETREL) and Pridopidine (HUNTEXIL). Examples of anti-cholinergics include benztropine mesylate (COGENTIN) and trihexyphenidyl (ARTANE). An example of acetylcholinesterase inhibitors include rivastigmine (EXELON).

In various embodiments, the perturbation is any one of bafilomycin, carbonyl cyanide m-chlorophenyl hydrazone (CCCP), MGA312, rotenone, or valinomycin. In particular embodiments, the perturbation is bafilomycin. In particular embodiments, the perturbation is CCCP. In particular embodiments, the perturbation is MGA312. In particular embodiments, the perturbation is rotenone. In particular embodiments, the perturbation is valinomycin.

In various embodiments, a perturbation is provided to cells that are seeded and cultured within a well in a well plate. In particular embodiments, a perturbation is provided to cells within a well through an automated, high-throughput process. In various embodiments, a perturbation is applied to cells at a concentration between 0.1-100,000 nM. In various embodiments, a perturbation is applied to cells at a concentration between 1-10,000 nM. In various embodiments, a perturbation is applied to cells at a concentration between 1-5,000 nM. In various embodiments, a perturbation is applied to cells at a concentration between 1-2,000 nM. In various embodiments, a perturbation is applied to cells at a concentration between 1-1,000 nM. In various embodiments, a perturbation is applied to cells at a concentration between 1-500 nM. In various embodiments, a perturbation is applied to cells at a concentration between 1-250 nM. In various embodiments, a perturbation is applied to cells at a concentration between 1-100 nM. In various embodiments, a perturbation is applied to cells at a concentration between 1-50 nM. In various embodiments, a perturbation is applied to cells at a concentration between 1-20 nM. In various embodiments, a perturbation is applied to cells at a concentration between 1-10 nM. In various embodiments, a perturbation is applied to cells at a concentration between 10-50,000 nM. In various embodiments, a perturbation is applied to cells at a concentration between 10-10,000 Mn. In various embodiments, a perturbation is applied to cells at a concentration between 10-1,000 nM. In various embodiments, a perturbation is applied to cells at a concentration between 10-500M. In various embodiments, a perturbation is applied to cells at a concentration between 100-1000 nM. In various embodiments, a perturbation is applied to cells at a concentration between 200-1000 nM. In various embodiments, a perturbation is applied to cells at a concentration between 500-1000 nM. In various embodiments, a perturbation is applied to cells at a concentration between 300-2000 nM. In various embodiments, a perturbation is applied to cells at a concentration between 350-1600 nM. In various embodiments, a perturbation is applied to cells at a concentration between 500-1200 nM.

In various embodiments, a perturbation is applied to cells at a concentration between 1-100 μM. In various embodiments, a perturbation is applied to cells at a concentration between 1-50 μM. In various embodiments, a perturbation is applied to cells at a concentration between 1-25 μM. In various embodiments, a perturbation is applied to cells at a concentration between 5-25 μM. In various embodiments, a perturbation is applied to cells at a concentration between 10-15 μM. In various embodiments, a perturbation is applied to cells at a concentration of about 1 μM. In various embodiments, a perturbation is applied to cells at a concentration of about 5 μM. In various embodiments, a perturbation is applied to cells at a concentration of about 10 μM. In various embodiments, a perturbation is applied to cells at a concentration of about 15 μM. In various embodiments, a perturbation is applied to cells at a concentration of about 20 μM. In various embodiments, a perturbation is applied to cells at a concentration of about 25 μM. In various embodiments, a perturbation is applied to cells at a concentration of about 40 μM. In various embodiments, a perturbation is applied to cells at a concentration of about 50 μM.

In various embodiments, a perturbation is applied to cells for at least 30 minutes. In various embodiments, a perturbation is applied to cells for at least 1 hour. In various embodiments, a perturbation is applied to cells for at least 2 hours. In various embodiments, a perturbation is applied to cells for at least 3 hours. In various embodiments, a perturbation is applied to cells for at least 4 hours. In various embodiments, a perturbation is applied to cells for at least 6 hours. In various embodiments, a perturbation is applied to cells for at least 8 hours. In various embodiments, a perturbation is applied to cells for at least 12 hours. In various embodiments, a perturbation is applied to cells for at least 18 hours. In various embodiments, a perturbation is applied to cells for at least 24 hours. In various embodiments, a perturbation is applied to cells for at least 36 hours. In various embodiments, a perturbation is applied to cells for at least 48 hours. In various embodiments, a perturbation is applied to cells for at least 60 hours. In various embodiments, a perturbation is applied to cells for at least 72 hours. In various embodiments, a perturbation is applied to cells for at least 96 hours. In various embodiments, a perturbation is applied to cells for at least 120 hours. In various embodiments, a perturbation is applied to cells for between 30 minutes and 120 hours. In various embodiments, a perturbation is applied to cells for between 30 minutes and 60 hours. In various embodiments, a perturbation is applied to cells for between 30 minutes and 24 hours. In various embodiments, a perturbation is applied to cells for between 30 minutes and 12 hours. In various embodiments, a perturbation is applied to cells for between 30 minutes and 6 hours. In various embodiments, a perturbation is applied to cells for between 30 minutes and 4 hours. In various embodiments, a perturbation is applied to cells for between 30 minutes and 2 hours.

Imaging Device

The imaging device (e.g., imaging device 120 shown in FIG. 1) captures one or more images of the cells which are analyzed by the predictive model system 130. The cells may be cultured in an e.g., in vitro 2D culture, in vitro 3D culture, or ex vivo. Generally, the imaging device is capable of capturing signal intensity from dyes (e.g., cell stains 150) that have been applied to the cells. Therefore, the imaging device captures one or more images of the cells including signal intensity originating from the dyes. In particular embodiments, the dyes are fluorescent dyes and therefore, the imaging device captures fluorescent signal intensity from the dyes. In various embodiments, the imaging device is any one of a fluorescence microscope, confocal microscope, or two-photon microscope.

In various embodiments, the imaging device captures images across multiple fluorescent channels, thereby delineating the fluorescent signal intensity that is present in each image. In one scenario, the imaging device captures images across at least 2 fluorescent channels. In one scenario, the imaging device captures images across at least 3 fluorescent channels. In one scenario, the imaging device captures images across at least 4 fluorescent channels. In one scenario, the imaging device captures images across at least 5 fluorescent channels.

In various embodiments, the imaging device captures one or more images per well in a well plate that includes the cells. In various embodiments, the imaging device captures at least 10 tiles per well in the well plates. In various embodiments, the imaging device captures at least 15 tiles per well in the well plates. In various embodiments, the imaging device captures at least 20 tiles per well in the well plates. In various embodiments, the imaging device captures at least 25 tiles per well in the well plates. In various embodiments, the imaging device captures at least 30 tiles per well in the well plates. In various embodiments, the imaging device captures at least 35 tiles per well in the well plates. In various embodiments, the imaging device captures at least 40 tiles per well in the well plates. In various embodiments, the imaging device captures at least 45 tiles per well in the well plates. In various embodiments, the imaging device captures at least 50 tiles per well in the well plates. In various embodiments, the imaging device captures at least 75 tiles per well in the well plates. In various embodiments, the imaging device captures at least 100 tiles per well in the well plates. Therefore, in various embodiments, the imaging device captures numerous images per well plate. For example, the imaging device can capture at least 100 images, at least 1,000 images, or at least 10,000 images from a well plate. In various embodiments, when the high-throughput disease prediction system 140 is implemented over numerous well plates and cell lines, at least 100 images, at least 1,000 images, at least 10,000 images, at least 100,000 images, or at least 1,000,000 images are captured for subsequent analysis.

In various embodiments, imaging device may capture images of cells over various time periods. For example, the imaging device may capture a first image of cells at a first timepoint and subsequently capture a second image of cells at a second timepoint. In various embodiments, the imaging device may capture a time lapse of cells over multiple time points (e.g., over hours, over days, or over weeks). Capturing images of cells at different time points enables the tracking of cell behavior, such as cell mobility, which can be informative for predicting the ages of different cells. In various embodiments, to capture images of cells across different time points, the imaging device may include a platform for housing the cells during imaging, such that the viability of the cultured cells is not impacted during imaging. In various embodiments, the imaging device may have a platform that enables control over the environment conditions (e.g., $O_2$ or $CO_2$ content, humidity, temperature, and pH) that are exposed to the cells, thereby enabling live cell imaging.

System and/or Computer Embodiments

Figure 6:
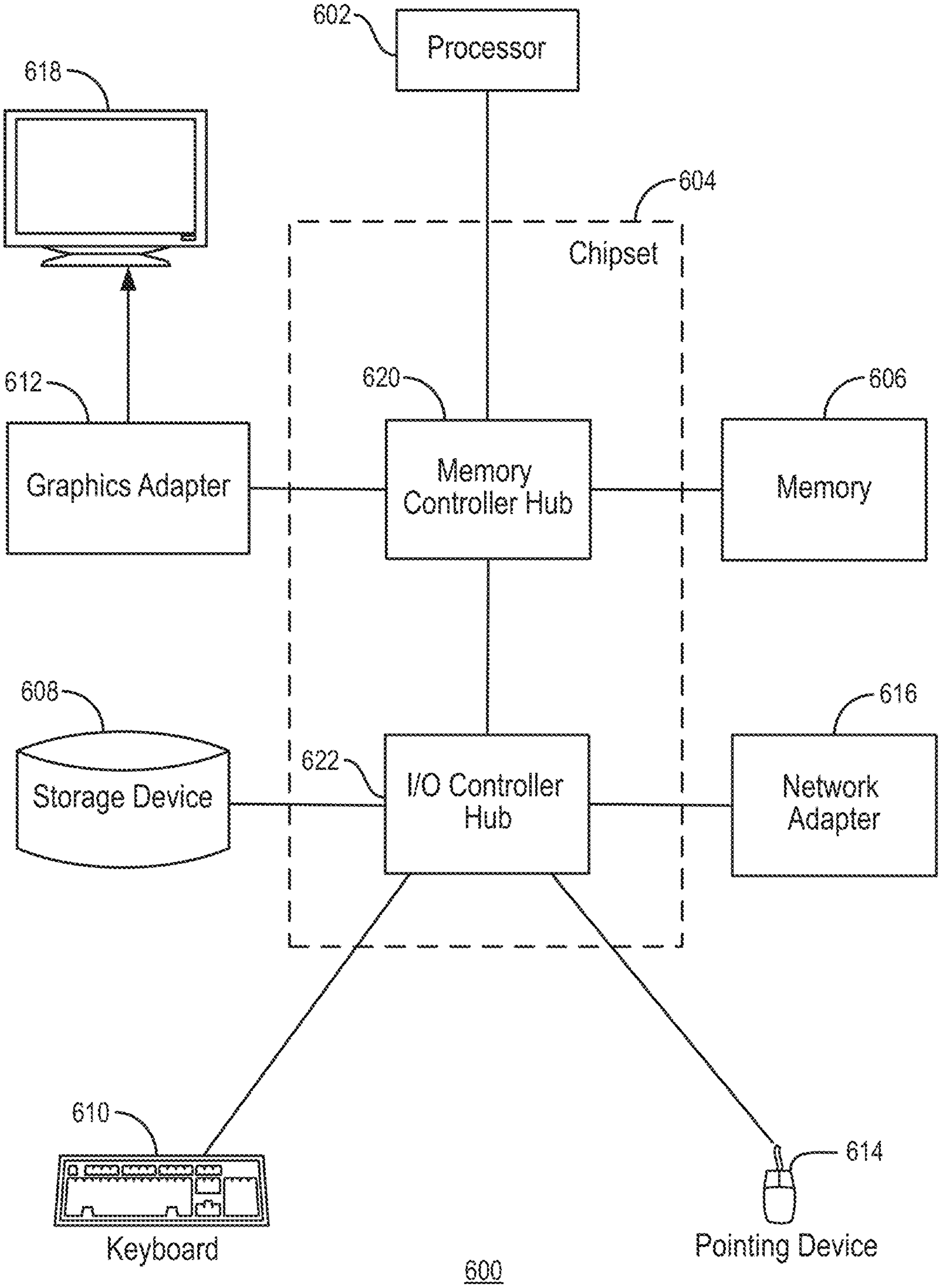
FIG. 6 depicts an example computing device for implementing system and methods described in reference to FIGS. 1-5.

FIG. 6 depicts an example computing device 600 for implementing system and methods described in reference to FIGS. 1-5. Examples of a computing device can include a personal computer, desktop computer laptop, server computer, a computing node within a cluster, message processors, hand-held devices, multi-processor systems, microprocessor-based or programmable consumer electronics, network PCs, minicomputers, mainframe computers, mobile telephones, PDAs, tablets, pagers, routers, switches, and the like. In various embodiments, the computing device 600 can operate as the predictive model system 130 shown in FIG. 1 (or a portion of the predictive model system 130). Thus, the computing device 600 may train and/or deploy predictive models for predicting disease states of cells.

In some embodiments, the computing device 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input interface 614, and network adapter 616 are coupled to the I/O controller hub 622. Other embodiments of the computing device 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of input interface, a keyboard, or some combination thereof, and is used to input data into the computing device 600. In some embodiments, the computing device 600 may be configured to receive input (e.g., commands) from the input interface 614 via gestures from the user. The graphics adapter 612 displays images and other information on the display 618. The network adapter 616 couples the computing device 600 to one or more computer networks.

The computing device 600 is adapted to execute computer program modules for providing functionality described herein. As used herein, the term “module” refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computing devices 600 can vary from the embodiments described herein. For example, the computing device 600 can lack some of the components described above, such as graphics adapters 612, input interface 614, and displays 618. In some embodiments, a computing device 600 can include a processor 602 for executing instructions stored on a memory 606.

The methods disclosed herein can be implemented in hardware or software, or a combination of both. In one embodiment, a non-transitory machine-readable storage medium, such as one described above, is provided, the medium comprising a data storage material encoded with machine readable data which, when using a machine programmed with instructions for using said data, is capable of displaying any of the datasets and execution and results of this invention. Such data can be used for a variety of purposes, such as patient monitoring, treatment considerations, and the like. Embodiments of the methods described above can be implemented in computer programs executing on programmable computers, comprising a processor, a data storage system (including volatile and non-volatile memory and/or storage elements), a graphics adapter, an input interface, a network adapter, at least one input device, and at least one output device. A display is coupled to the graphics adapter. Program code is applied to input data to perform the functions described above and generate output information. The output information is applied to one or more output devices, in known fashion. The computer can be, for example, a personal computer, microcomputer, or workstation of conventional design.

Each program can be implemented in a high-level procedural or object-oriented programming language to communicate with a computer system. However, the programs can be implemented in assembly or machine language, if desired. In any case, the language can be a compiled or interpreted language. Each such computer program is preferably stored on a storage media or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The signature patterns and databases thereof can be provided in a variety of media to facilitate their use. "Media" refers to a manufacture that contains the signature pattern information of the present invention. The databases of the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. "Recorded" refers to a process for storing information on computer readable medium, using any such methods as known in the art. Any convenient data storage structure can be chosen, based on the means used to access the stored information. A variety of data processor programs and formats can be used for storage, e.g., word processing text file, database format, etc.

ADDITIONAL EMBODIMENTS

The present disclosure describes combining advances in machine learning and scalable automation, to develop an automated high-throughput screening platform for the morphology-based profiling of Parkinson's Disease. Utilizing 96 human fibroblast cell lines, cell lines are matched between batches (n=4) with ~90-fold higher accuracy compared to chance alone. Additionally, in terms of sensitivity, cells from two skin punches from the same individual, even acquired years apart, look more similar than cells derived from different individuals. Importantly, methods disclosed herein differentiate LRRK2 disease samples from healthy individuals, and also enable the detection of a distinct signature associated with sporadic PD as compared to healthy controls. Taken together, this scalable, high-throughput automated platform coupled with deep learning provides a novel screening technique for Parkinson's Disease (PD).

Accordingly, the invention provides an automated system for analyzing cells to determine a disease specific cell signature. The system includes a cell culture unit for culturing cells, and an imaging system operable to generate images of the cells and analyze the images of the cells. The imaging system includes a computer processor having instructions for identifying a disease specific cell signature, such as a disease specific morphological feature of the cells based on the cell images. In some aspects, the disease specific signature is a PD specific morphological feature.

Embodiments disclosed herein also provide an automated method for analyzing cells which includes culturing cells and analyzing the cultured cells using the system of the invention. Embodiments disclosed herein further provide a method for automated screening using the system of the invention. The method includes culturing cells having a disease specific signature, contacting the cell with a putative therapeutic agent or an exogenous stressor, and analyzing the cells and identifying a change in the disease specific signature caused by the putative therapeutic agent or the exogenous stressor, thereby performing automated screening.

Disclosed herein is an automated system for analyzing cells comprising: a) a cell culture unit for culturing cells; and b) an imaging system operable to generate images of the cells and analyze the images of the cells, wherein the imaging system comprises a computer processor having instructions for identifying a disease specific signature of the cells.

In various embodiments, the cells are from a subject having Parkinson's Disease (PD). In various embodiments, analyzing the disease specific signature of the cells comprises determining one or more PD specific morphological features. In various embodiments, the PD is classified as sporadic PD or LRRK2 PD. In various embodiments, the cells are stained with one or more fluorescent dyes prior to being imaged. In various embodiments, analysis comprises use of a logistic regression model trained on well-mean cell image embeddings.

Additionally disclosed herein is an automated method for analyzing cells comprising culturing cells and analyzing the cultured cells via the system described herein. In various embodiments, methods disclosed herein further comprise classifying a cell as having a disease specific signature. In various embodiments, the disease specific signature is a PD specific morphological feature. In various embodiments, the PD specific morphological feature is specific to sporadic PD or LRRK2 PD.

Additionally disclosed herein is a method for automated screening via the system disclosed herein, the method comprising: a) culturing cells having a disease specific signature; b) contacting the cell with a putative therapeutic agent or an exogenous stressor; and c) analyzing the cells of b) and identifying a change in the disease specific signature caused by the putative therapeutic agent or the exogenous stressor, thereby performing automated screening. In various embodiments, the disease specific signature is s PD specific morphological feature.

EXAMPLES

Example 1: Example Disease Analysis Pipeline

Disclosed herein is an automated platform to morphologically profile large collections of cells leveraging the cell culture automation capabilities of the New York Stem Cell Foundation (NYSCF) Global Stem Cell Array®, a modular robotic platform for large-scale cell culture automation. The NYSCF Global Stem Cell Array was applied to search for Parkinson's disease-specific cellular signatures in primary human fibroblasts. Starting from a collection of more than 1000 fibroblast lines in the NYSCF repository that were collected and derived using highly standardized methods, a subset of PD lines were selected from sporadic patients and patients carrying LRRK2 (G2019S) or GBA (N370S) mutations, as well as age-, sex-, and ethnicity-matched healthy controls. All lines underwent thorough genetic quality control and exclusion criteria-based profiling, which yielded lines from 45 healthy controls, 32 sporadic PD, 8 GBA PD and 6 LRRK2 PD donors; 5 participants also donated a second skin biopsy 3 to 6 years later, which were analyzed as independent lines, for a total of 96 cell lines.

Figure 7A:
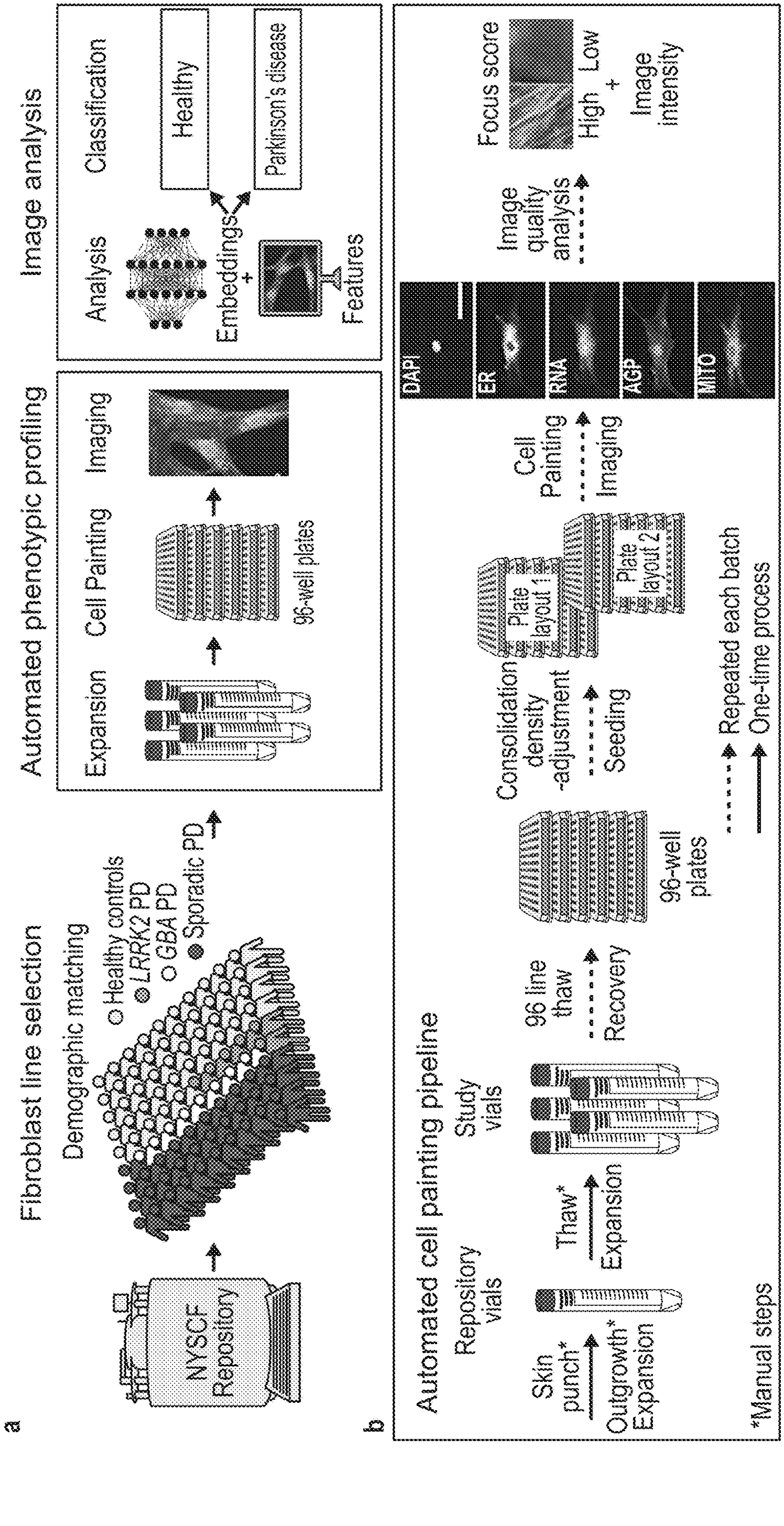
FIG. 7A depicts an example disease analysis pipeline.
Figure 7B:
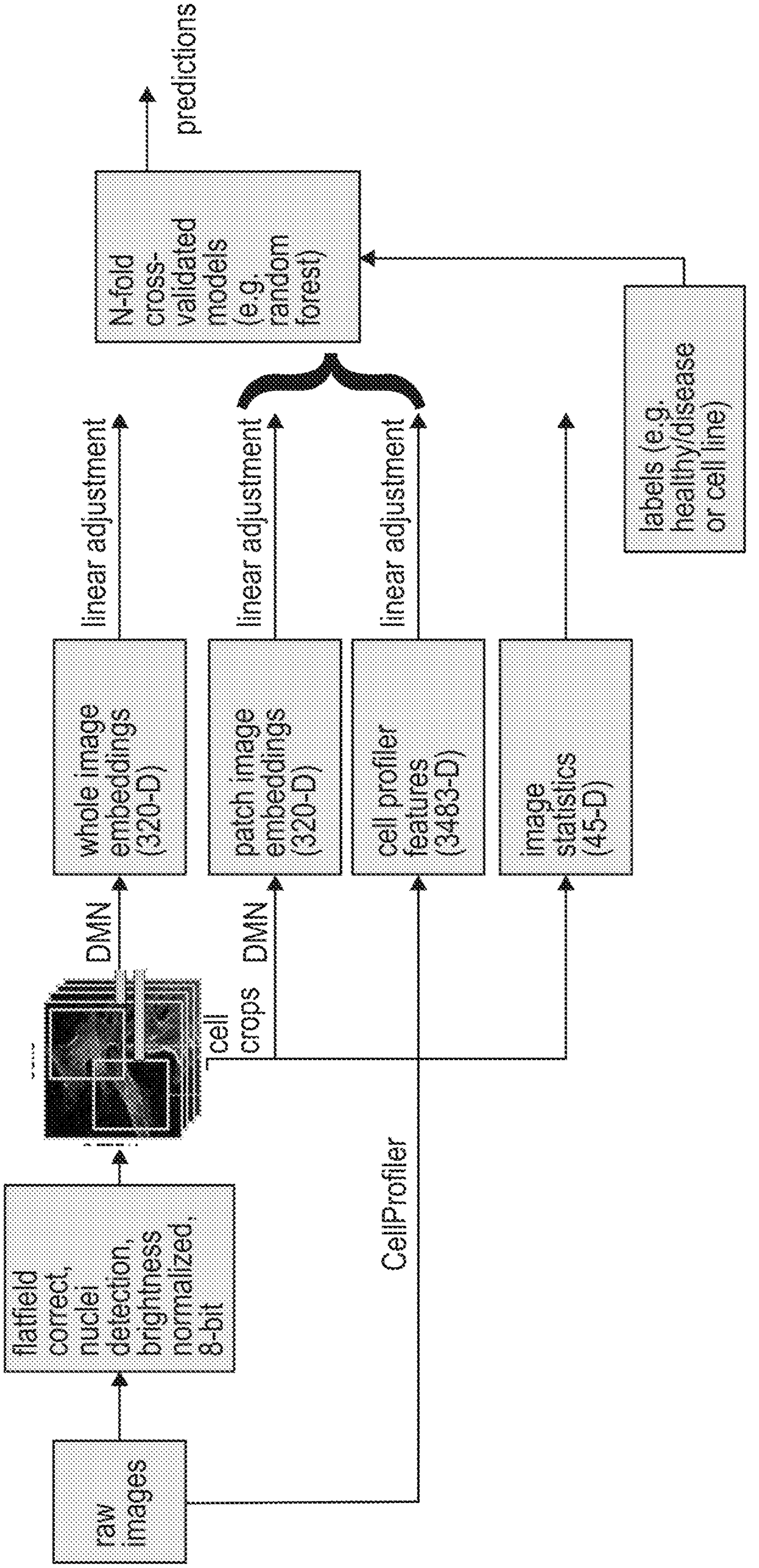
FIG. 7B depicts the image analysis of an example disease analysis pipeline in further detail.

FIG. 7A depicts the automated, high-content profiling platform. Specifically, the top row of FIG. 7A shows a workflow overview and the bottom row of FIG. 7A shows an overview of the automated experimental pipeline. Scale bar: 35 μm. FIG. 7B shows the image analysis pipeline in further detail for generating predictions. Specifically, FIG. 7B depicts an overview that includes a deep metric network (DMN) that maps each whole or cell crop image independently to an embedding vector, which, along with CellProfiler features and basic image statistics, are used as data sources for model fitting and evaluation for various supervised prediction tasks.

Figure 8A:
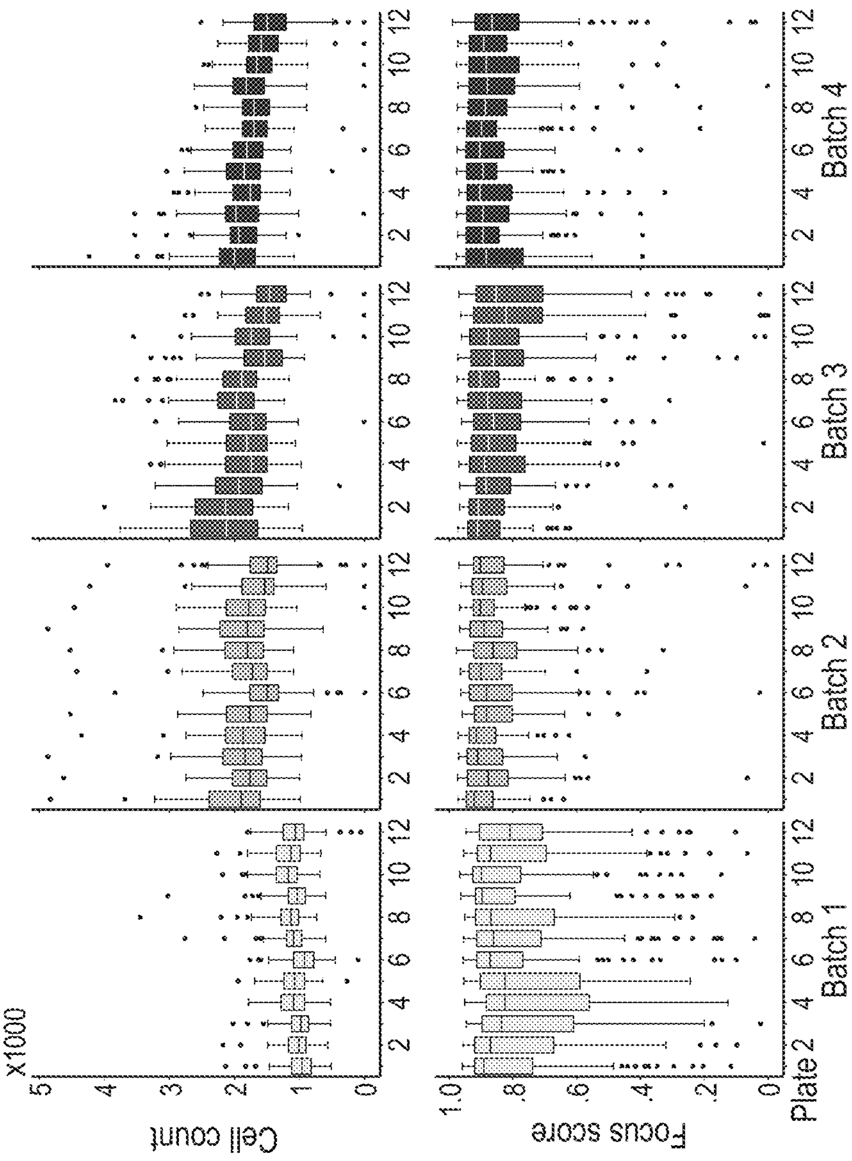
FIGS. 8A and 8B show low variation across batches in: well-level cell count, well-level image focus across the endoplasmic reticulum (ER) channel per plate, and well-level foreground staining intensity distribution per channel and plate.
Figure 8B:
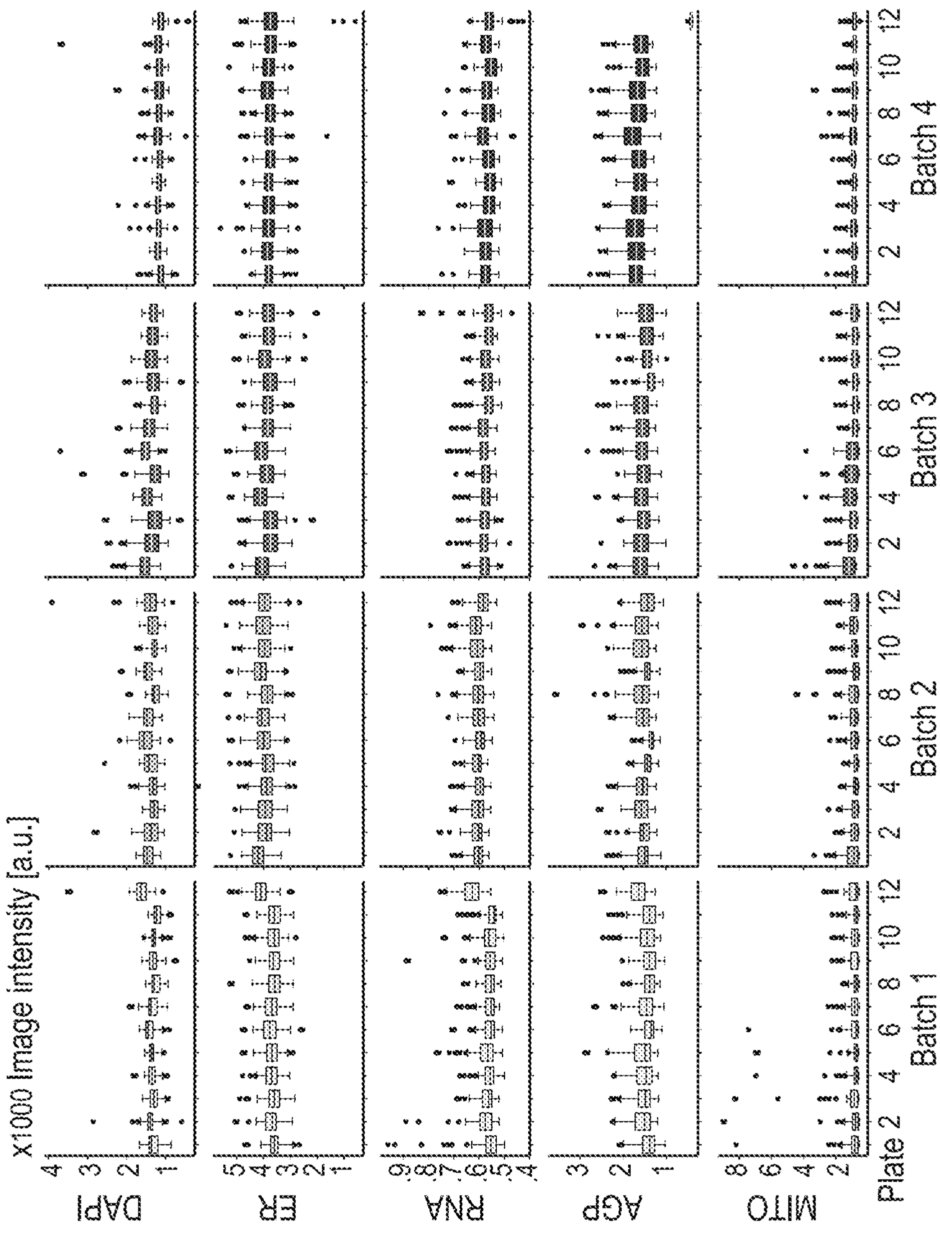

Altogether, running the high-content profiling pipeline shown in FIG. 7A yielded low variation across batches in: well-level cell count (top row FIG. 8A); well-level image focus across the endoplasmic reticulum (ER) channel per plate (bottom row FIG. 8A); and well-level foreground staining intensity distribution per channel and plate (FIG. 8B). Box plot components are: horizontal line, median; box, interquartile range; whiskers, 1.5× interquartile range; black squares, outliers.

Returning to FIG. 7A, the automated procedures were applied for cell thawing, expansion and seeding, which were designed to minimize experimental variation and maximize reproducibility across plates and batches (bottom row FIG. 7A). This method resulted in consistent growth rates across all 4 experimental groups during expansion although some variation was seen in assay plate cell counts. Importantly, overall cell counts for healthy and PD cell lines remained highly similar.

Two days after seeding into assay plates, automated procedures were applied to stain the cells with Cell Painting dyes for multiplexed detection of cell compartments and morphological features (nucleus (DAPI), nucleoli and cytoplasmic RNA (RNA), endoplasmic reticulum (ER), actin, golgi and plasma membrane (AGP), and mitochondria (MITO)). Plates were then imaged in 5 fluorescent channels with 76 tiles per well, resulting in uniform image intensity and focus quality across batches and ~1 terabyte of data per plate. Additionally, to ensure consistent data quality across wells, plates and batches, an automated tool was built for near real-time quantitative evaluation of image focus and staining intensity within each channel. The tool is based on random sub-sampling of tile images within each well of a plate to facilitate immediate analysis. Finally, the provenance of all but two cell lines were confirmed. In summary, an end-to-end platform was built that consistently and robustly thaws, expands, plates, stains, and images primary human fibroblasts for phenotypic screening.

Methods

Donor recruitment and biopsy collection. This project utilized fibroblasts collected under a Western IRB-approved protocol at New York Stem Cell Foundation Research Institute (NYSCF), which complied with all relevant ethical regulations. After providing written consent, participants received a 2-3 mm punch biopsy under local anesthesia performed by a dermatologist at a collaborating clinic. The dermatologists utilized clinical judgement to determine the appropriate location for the biopsy, with the upper arm being most common. Individuals with a history of scarring and bleeding disorders were ineligible to participate. In addition to biological sample collection, all participants completed a health information questionnaire detailing their personal and familial health history, accompanied by demographic information. All participants with PD self-reported this diagnosis and all but three participants with PD had research records from the same academic medical center in New York available which confirmed a clinical PD diagnosis. To protect participant confidentiality, the biological sample and data were coded and the key to the code securely maintained.

Experimental design and validation. Cell lines were selected from the NYSCF fibroblast repository containing cell lines from over 1000 participants. Strict exclusion criteria were applied based on secondary (non-PD) pathologies, including skin cancer, stroke, epilepsy, seizures, and neurological disorders and, for sporadic PD cases, UPDRS scores below 15. Out of the remaining cell lines, 120 healthy control and PD cell lines were preliminarily matched based on donor age and sex; all donors were self-reported white and most were confirmed to have at least 88% European ancestry via genotyping. The 120 cell lines were all expanded in groups of eight, comprising two pairs of PD and preliminary matched healthy controls, and after expansion was completed, a final set of 96 cell lines, including a set of 45 PD and final matched healthy controls, was selected for the study.

Cells were expanded and frozen to conduct four identical batches, each consisting of twelve 96-well plates in two unique plate layouts, of which each plate contained exactly one cell line per well. The plate layout consisted of a checkerboard-like pattern of placement of healthy control and Parkinson's cell lines and cell lines on the edge of the plate in one plate layout were near the center in the other layout. Plate layout designs from three random reorderings of the cell line pairs were considered, and the best performing design was selected. Specifically, the sought design minimized the covariate weights of a cross-validated linear regression model with L1 regularization with the following covariates as features: participant age (above or at/below 64 years), sex (male or female), biopsy location (arm, leg, not arm or leg, left, right, not left or right, unspecified), biopsy collection year (at/before or after 2013), expansion thaw freeze date (on/before or after Jul. 11, 2019), thaw format, doubling time (at/less than or greater than 3.07 days), and plate location (well positions not in the center in both layouts, well positions on the edge in at least one plate layout, well positions on a corner in at least one plate layout, row (A/B, C/D, G/E, F/H), column (1-3, 4-6, 7-9, 10-12).

After the experiment was conducted, to further confirm the total number of cells or the growth rates did not represent a potential confound, the count of cells were reviewed, extracted from the CellProfiler analysis, and the doubling time of each cell line by disease state (healthy, sporadic PD, LRRK2 PD and GBA PD) was investigated. A two-sided Mann-Whitney U test, Bonferroni adjusted for 3 comparisons, did not highlight statistical differences.

Cell line expansion. Biopsy outgrowth was performed as described in Paull et al. Briefly, each biopsy was washed in biopsy plating media containing Knockout-DMEM (Life Technologies #10829-018), 10% FBS (Life Technologies, #100821-147), 2 mM GlutaMAX (Life Technologies, #35050-061), 0.1 mM MEM Non-Essential Amino Acids (Life Technologies, #11140-050), 1× Antibiotic-Antimycotic, 0.1 mM 2-Mercaptoethanol (Life Technologies, #21985-023) and 1% Nucleosides (Millipore, #ES-008-D), dissected into small pieces and allowed to attach to a 6-well tissue culture plate, and grown out for 10 days before being enzymatically dissociated using TrypLE CTS (Life Technologies, #A12859-01) and re-plated at a 1:1 ratio. Cell density was monitored with daily automated bright-field imaging and upon gaining confluence, cells were harvested and frozen down into repository vials at a density of 100,000 cells per vial in 1.5 mL of CTS Synth-a-Freeze (Life Technologies, #A13717-01) using automated procedures developed on the NYSCF Global Stem Cell Array®.

To expand cells for profiling, custom automation procedures were developed on an automation platform consisting of a liquid handling system (Hamilton STAR) connected to a Cytomat C24 incubator, a Celigo cell imager (Nexcelom), a VSpin centrifuge (Agilent), and a Matrix tube decapper (Hamilton Storage Technologies). Repository vials were thawed manually in two batches of 4, for a total of 8 lines per run. To reduce the chance of processing confounds, when possible, every other line that was processed was a healthy control, the order of lines processed alternated between expansion groups, and the scientist performing the expansion was blinded to the experimental group. Repository tubes were placed in a 37° C. water bath for 1 minute. Upon removal, fibroblasts were transferred to their respective 15 mL conical tubes at a 1:2 ratio of Synth-a-Freeze and Fibroblast Expansion Media (FEM). All 8 tubes were spun at 1100 RPM for 4 minutes. Supernatant was aspirated and resuspended in 1 mL FEM for cell counting, whereby an aliquot of the supernatant was incubated with Hoechst (H3570, ThermoFisher) and Propidium Iodide (P3566, ThermoFisher) before being counted using a Celigo automated cell imager. Cells were plated in one well of a 6-well at 85,000-120,000 cells in 2 mL of FEM. If the count was lower than 75,000, cells were plated into a 12-well plate and given the appropriate amount of time to reach confluence. Upon reaching 90-100% confluence, the cell line was added into another group of 8 to enter the automated platform. All 6-well and 12-well plates were kept in a Cytomat C24 incubator and every passage and feed from this point onward was automated (Hamilton STAR). Each plate had a FEM media exchange every other day and underwent passages every 7th day. The cells were fed with FEM using an automated method that retrieved the plates from the Cytomat two at a time and exchanged the media.

After 7 days, the batch of 8 plates had a portion of their supernatant removed and banked for mycoplasma testing. Cells were passaged and plated at 50,000 cells per well (into up to 6 wells of a 6 well plate) and allowed to grow for another 7 days. Not every cell line was expected to reach the target of filling an entire 6-well plate. To account for this, a second passage at a fixed seeding density of 50,000 cells per well was embedded in the workflow for all the lines. After another 7 days, each line had a full 6-well plate of fibroblasts and generated a minimum of 5 assay vials with 100,000 cells per vial. The average doubling time for each cell line was calculated by taking the log base 2 of the ratio of the cell number at harvest over the initial cell number. Each line was then propagated a further two passages and harvested to cryovials for DNA extraction.

Automated screening. Custom automation procedures were developed for large-scale phenotypic profiling of primary fibroblasts. For each of the four experimental batches, 2D barcoded matrix vials from 96 lines containing 100,000 cells per vial were thawed, decapped and rinsed with FEM. Cells were spun down at 192 g for 5 minutes, supernatant was discarded, and cells were resuspended in culture media. Using a Hamilton Star liquid handling system, the cells were then seeded onto five 96-well plates (Fisher Scientific, 07-200-91) for post-thaw recovery. Cells were harvested 5 days later using automated methods as previously described in Paull et al., and counted using a Celigo automated imager as described above. Using an automated seeding method developed on a Lynx liquid handling system (Dynamic Devices, LMI800), cell counts from each line were used to adjust cell densities across all 96 lines to transfer a fixed number of cells into two 96-well deep well troughs in two distinct plate layouts. Each layout was then stamped onto six 96-well imaging plates (CellVis, P96-1.5H-N) at a fixed target density of 3,000 cells per well. Assay plates were then transferred to a Cytomat C24 incubator for two days before phenotypic profiling where cells were stained and imaged as described below. All cell lines were screened at a final passage number of 10 or 11+/−2. In total, this process took 7 days and could be executed by a single operator.

Staining and imaging. To fluorescently label the cells, the protocol published in Bray et al. was adapted to an automated liquid handling system (Hamilton STAR). Briefly, plates were placed on deck for addition of culture medium containing MitoTracker (Invitrogen™ M22426) and incubated at 37° C. for 30 minutes, then cells were fixed with 4% Paraformaldehyde (Electron Microscopy Sciences, 15710-S), followed by permeabilization with 0.1% Triton X-100 (Sigma-Aldrich, T8787) in 1× HBSS (Thermo Fisher Scientific, 14025126). After a series of washes, cells were stained at room temperature with the Cell Painting staining cocktail for 30 minutes, which contains Concanavalin A, Alexa Fluor® 488 Conjugate (Invitrogen™ C11252), SYTO® 14 Green Fluorescent Nucleic Acid Stain (Invitrogen™ S7576), Alexa Fluor® 568 Phalloidin (Invitrogen™ A12380), Hoechst 33342 trihydrochloride, trihydrate (Invitrogen™ H3570), Molecular Probes Wheat Germ Agglutinin, Alexa Fluor 555 Conjugate (Invitrogen™ W32464). Plates were washed twice and imaged immediately.

The images were acquired using an automated epifluorescence system (Nikon Ti2). For each of the 96 wells acquired per plate, the system performed an autofocus task in the ER channel, which provided dense texture for contrast, in the center of the well, and then acquired 76 non-overlapping tiles per well at a 40× magnification (Olympus CFI-60 Plan Apochromat Lambda 0.95 NA). To capture the entire Cell Painting panel, 5 different combinations of excitation illumination (SPECTRA X from Lumencor) and emission filters (395 nm and 447/60 nm for Hoechst, 470 nm and 520/28 nm for Concanavalin A, 508 nm and 593/40 nm for RNA-SYTO14, 555 nm and 640/40 nm for Phalloidin and wheat-germ agglutinin, and 640 nm and 692/40 nm for MitoTracker Deep Red) were used. Each 16-bit 5056×2960 tile image was acquired using NIS-Elements AR acquisition software from the image sensor (Photometrics Iris 15, 4.25 μm pixel size). Each 96-well plate resulted in approximately 1 terabyte of data.

Confirming cell line provenance. All 96 lines were analyzed using NeuroChip or similar genome-wide SNP genotyping arrays to check for PD-associated mutations (LRRK2 G2019S and GBA N370S). PD Lines that did not contain LRRK2 or GBA mutations were classified as Sporadic. NeuroChip analysis confirmed the respective mutations for all lines from LRRK2 and GBA PD individuals, with the exceptions of cell line 48 from donor 10124, where no GBA mutation was detected, and the control cell line 77 (from donor 51274) where an N370S mutation was identified. This prompted a post hoc ID SNP analysis (using Fluidigm SNPTrace) of all expanded study materials, which confirmed the lines matched the original ID SNP analysis made at the time of biopsy collection for all but two cell lines: cell line 48 from donor 10124 (GBA PD) and cell line 57 from donor 50634 (healthy), which have been annotated as having unconfirmed cell line identity. The omission of line 48 and 77 was confirmed to not qualitatively impact GBA PD vs healthy classification and although line 57 was most likely from another healthy individual, the omission of line 57 was confirmed to have minimal impact, yielding a 0.77 (0.08 SD) ROC AUC (compared with 0.79 (0.08 SD) from including the line) for LRRK2/Sporadic PD vs. healthy classification (logistic regression trained on tile deep embeddings). Importantly, the post hoc ID SNP analysis did confirm the uniqueness of all 96 lines in the study. Finally, for a subset of 89 of the 96 lines, which were genotyped using the NeuroChip, none of these lines contained any other variants reported in Clinvar to have a causal, pathogenic association with PD, across mutations spanning genes GBA, LRRK2, MAPT, PINK1, PRKN and SNCA (except those already reported to carry G2019S (LRRK2) and N370S (GBA)).

Image statistics features. For assessing data quality and baseline predictive performance on classification tasks, various image statistics were computed. Statistics are computed independently for each of the 5 channels for the image crops centered on detected cell objects. For each tile or cell, a "focus score" between 0.0 and 1.0 was assigned using a pre-trained deep neural network model. Otsu's method was used to segment the foreground pixels from the background and the mean and standard deviation of both the foreground and background were calculated. Foreground fraction was calculated as the number of foreground pixels divided by the total pixels. All features were normalized by subtracting the mean of each batch and plate layout from each feature and then scaling each feature to have unit L2 norm across all examples.

Image pre-processing. 16-bit images were flat field-corrected. Next, Otsu's method was used in the DAPI channel to detect nuclei centers. Images were converted to 8-bit after clipping at the 0.001 and 1.0 minimum and maximum percentile values per channel and applying a log transformation. These 8-bit 5056×2960×5 images, along with 512×512×5 image crops centered on the detected nuclei, were used to compute deep embeddings. Only image crops existing entirely within the original image boundary were included for deep embedding generation.

Deep image embedding generation. Deep image embeddings were computed on both the tile images and the 512×512×5 cell image crops. In each case, for each image and each channel independently, the single channel image was duplicated across the RGB (red-green-blue) channels and then inputted the 512×512×3 image into an Inception architecture convolutional neural network, pre-trained on the ImageNet object recognition dataset consisting of 1.2 million images of a thousand categories of (non-cell) objects, and then extracted the activations from the penultimate fully connected layer and took a random projection to get a 64-dimensional deep embedding vector (i.e., 64×1×1). The five vectors from the 5 image channels were concatenated to yield a 320-dimensional vector or embedding for each tile or cell crop. 0.7% of tiles were omitted because they were either in wells never plated with cells due to shortages or because no cells were detected, yielding a final dataset consisting of 347,821 tile deep embeddings and 5,813,995 cell image deep embeddings. All deep embeddings were normalized by subtracting the mean of each batch and plate layout from each deep embedding. Finally, datasets of the well-mean deep embeddings were computed, the mean across all cell or tile deep embeddings in a well, for all wells.

CellProfiler feature generation. A CellProfiler pipeline template was used which determined Cells in the RNA channel, Nuclei in the DAPI channel and Cytoplasm by subtracting the Nuclei objects from the Cell objects. CellProfiler version 3.1.5 was ran independently on each 16-bit 5056×2960×5 tile image set, inside a Docker container on Google Cloud. 0.2% of the tiles resulted in errors after multiple attempts and were omitted. Features were concatenated across Cells, Cytoplasm and Nuclei to obtain a 3483-dimensional feature vector per cell, across 7,450,738 cells. A reduced dataset was computed with the well-mean feature vector per well. All features were normalized by subtracting the mean of each batch and plate layout from each feature and then scaled each feature to have unit L2 norm across all examples.

Modeling and analysis. Several classification tasks were evaluated ranging from cell line prediction to disease state prediction using various data sources and multiple classification models. Data sources consisted of image statistics, CellProfiler features and deep image embeddings. Since data sources and predictions could have existed at different levels of aggregation ranging from the cell-level, tile-level, well-level to cell line-level, well-mean aggregated data sources (i.e., averaging all cell features or tile embeddings in a well) were used as input to all classification models, and aggregated the model predictions by averaging predicted probability distributions (i.e., the cell line-level prediction, by averaging predictions across wells for a cell line). In each classification task, an appropriate cross-validation approach was defined and all figures of merit reported are those on the held-out test sets. For example, the well-level accuracy is the accuracy of the set of model predictions on the held out wells, and the cell line-level accuracy is the accuracy of the set of cell line-level predictions from held out wells. The former indicates the expected performance with just one well example, while the latter indicates expected performance from averaging predictions across multiple wells; any gap could be due to intrinsic biological, process or modeling noise and variation.

Various classification models (sklearn) were used, including a cross-validated logistic regression (solver="1bfgs", max_iter=1000000), random forest classifier (with 100 base estimators), cross-validated ridge regression and multilayer perceptron (single hidden layer with 200 neurons, max_iter=1000000); these settings ensured solver convergence to the default tolerance.

Cell line identification analysis. For each of the various data sources, the cross-validation sets were utilized. For each train/test split, one of several classification models was fit or trained to predict a probability distribution across the 96 classes, the ID of the 96 unique cell lines. For each prediction, both the top predicted cell line, the cell line class to which the model assigns highest probability, as well as the predicted rank, the rank of probability assigned to the true cell line (i.e., when the top predicted cell line is the correct one, the predicted rank is 1) were evaluated. As the figure of merit, the well-level or cell line-level accuracy, the fraction of wells or cell lines for which the top predicted cell line among the 96 possible choices was correct, was used.

Biopsy donor identification analysis. For each of the various data sources, the cross-validation sets were utilized. For each train/test split, one of several classification models was fit or trained to predict a probability distribution across 91 classes, the possible donors from which a given cell line was obtained. For each of the 5 held-out cell lines, the cell line-level predicted rank, i.e., the predicted rank assigned to the true donor was evaluated.

Experimental strategy for achieving unbiased deep learning-based image analysis. To analyze the high-content imaging data, a custom unbiased deep learning pipeline was built. In the pipeline, both cropped cell images and tile images (i.e., full-resolution microscope images) were fed through an Inception architecture deep convolutional neural network that had been pre-trained on ImageNet, an object recognition dataset to generate deep embeddings that could be viewed as lower-dimensional morphological profiles of the original images. In this dataset, each tile or cell was represented as a 64-dimensional vector for each of the 5 fluorescent channels, which were combined into a 320-dimensional deep embedding vector.

For a more comprehensive analysis, additionally used were a baseline basic image statistics (e.g. image intensity) and conventional cell image features extracted by a CellProfiler pipeline that computes 3483 features from each segmented cell. CellProfiler features, albeit potentially less accurate than deep image embeddings in some modeling tasks provide a comprehensive set of hand-engineered measurements that have a direct link to a phenotypic characteristic, facilitating biological interpretation of the phenotypes identified.

For modeling, the analysis involved several standard supervised machine learning models including random forest, multilayer perceptron and logistic regression classifier models, as well as ridge regression models, all of which output a prediction based on model weights fitted to training data, but can have varying performance based on the structure of signal and noise in a given dataset. These models were trained on the well-average deep embedding and feature vectors. Specifically, the average along each deep embedding or feature dimension was determined to obtain a single data point representative of all cellular phenotypes within a well. To appropriately assess model generalization on either data from new experiments or on data from new individuals, cross-validation stratified by batch or individuals for cell line and disease prediction, respectively.

Since deep learning-based analysis is highly sensitive, including to experimental confounds, each 96-well plate contained all 96 cell lines (one line per well) and incorporated two distinct plate layout designs to control for potential location biases. The plate layouts alternate control and PD lines every other well and also position control and PD lines paired by both age and sex in adjacent wells, when possible. The robustness of this experimental design was quantitatively confirmed by performing a lasso variable selection for healthy vs. PD on participant, cell line, and plate covariates, which did not reveal any significant biases. Four identical batches of the experiment were conducted, each with six replicates of each plate layout, yielding 48 plates of data, or approximately 48 wells for each of the 96 cell lines. In summary, a robust experimental design was employed that successfully minimized the effect of potential covariates; additionally, established was a comprehensive image analysis pipeline where multiple machine learning models were applied to each classification task, using both computed deep embeddings and extracted cell features as data sources.

Identification of individual cell lines based on morphological profiles using deep learning models. The strength and challenge of population-based profiling is the innate ability to capture individual variation. Similarly, the variation of high-content imaging data generated in separate batches is also a known confound in large-scale studies. Evaluating a large number of compounds, or, in this case, a large number of replicates to achieve a sufficiently strong disease model, necessitates aggregating data across multiple experimental batches. The line-to-line and batch-to-batch variation in the dataset was evaluated by determining whether a trained model could identify an individual cell line and further could successfully identify that same cell line in an unseen batch among n=96 cell lines. To this end, a cross-validation scheme was adopted where a model was fit to three out of four batches and its performance was evaluated on the fourth, held-out batch (and procedure conducted for all 4 batches). Importantly, the plate layout was also held out to ensure that the model was unable to rely on any possible location biases.

Figure 9A:
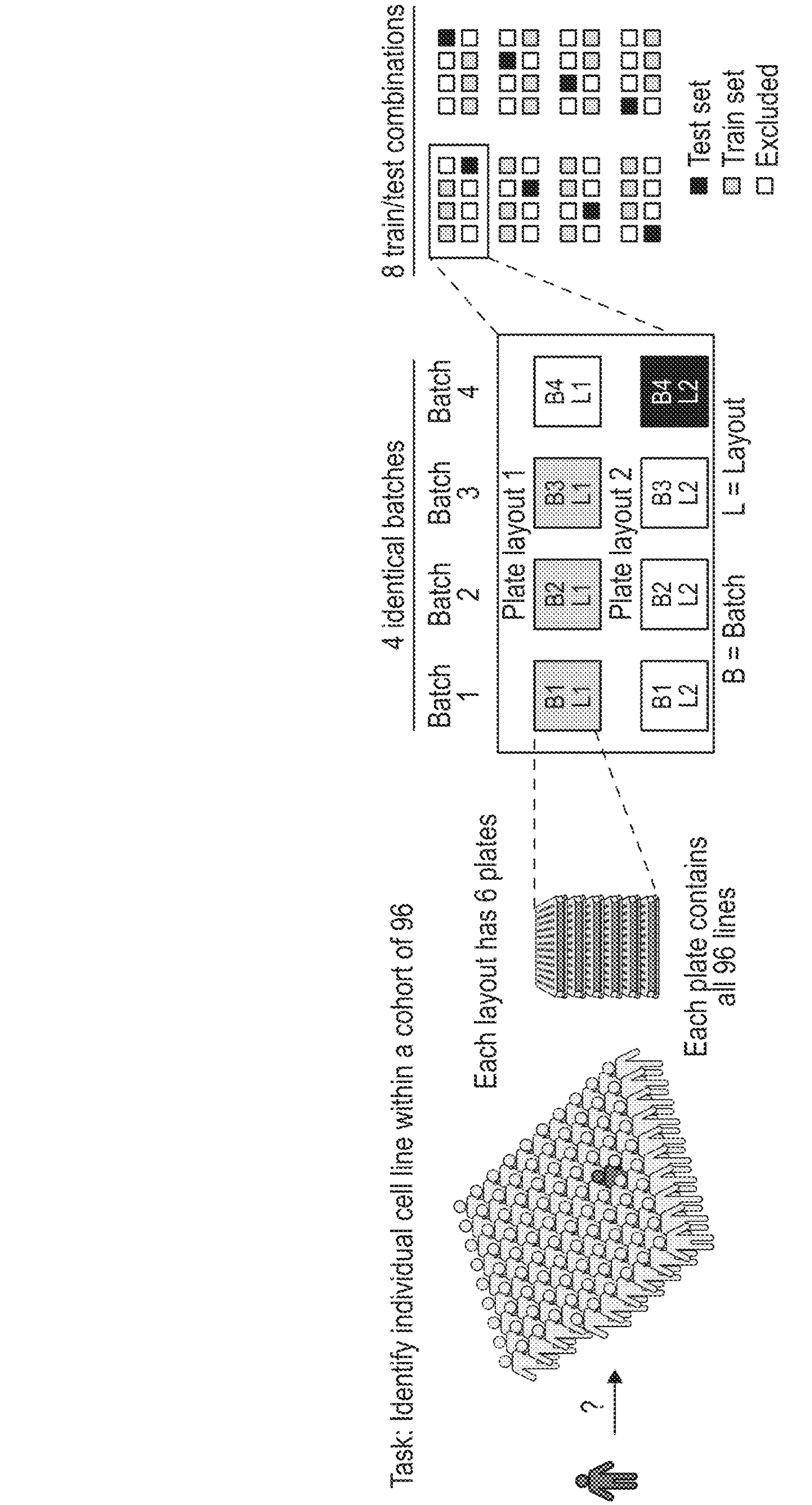
FIGS. 9A-9C show a robust identification of individual cell lines across batches and plate layouts.
Figure 9B:
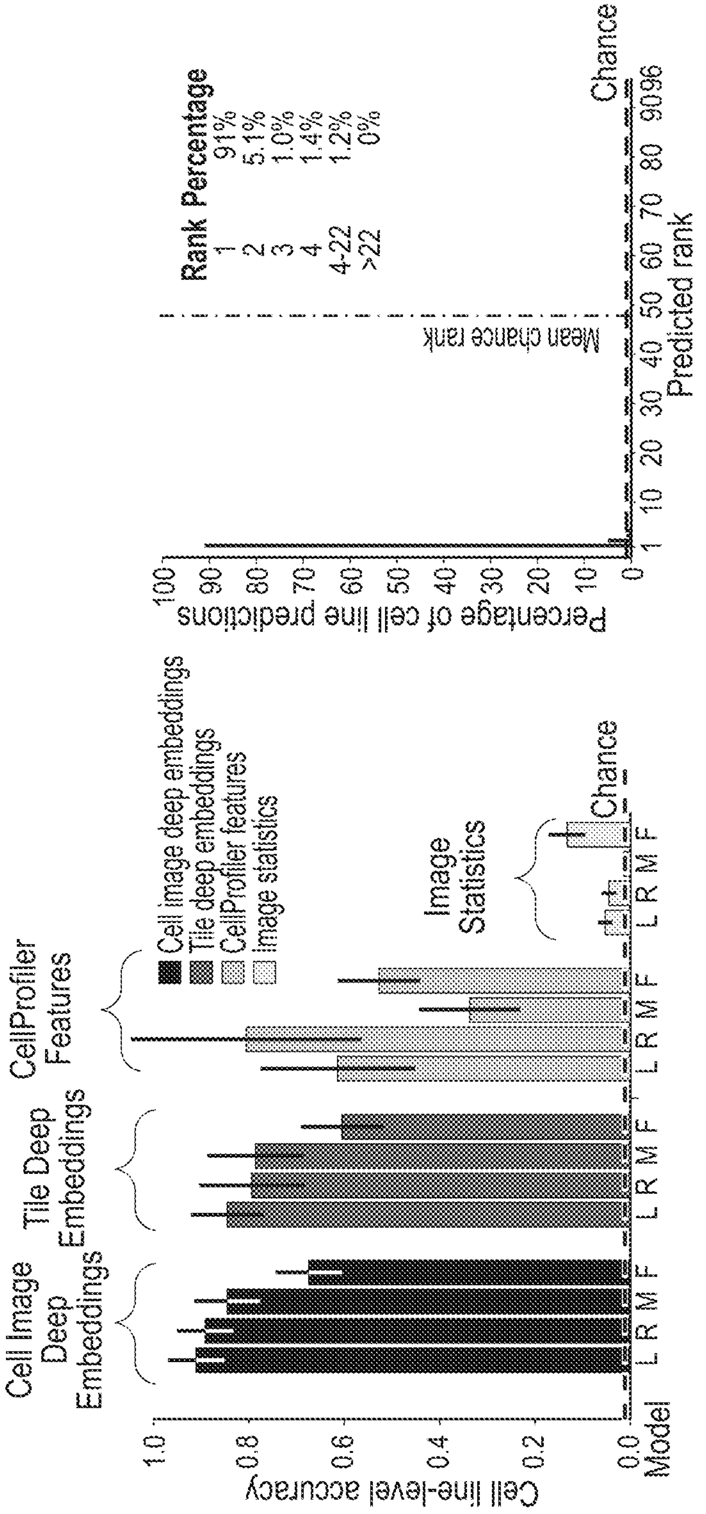
Figure 9C:
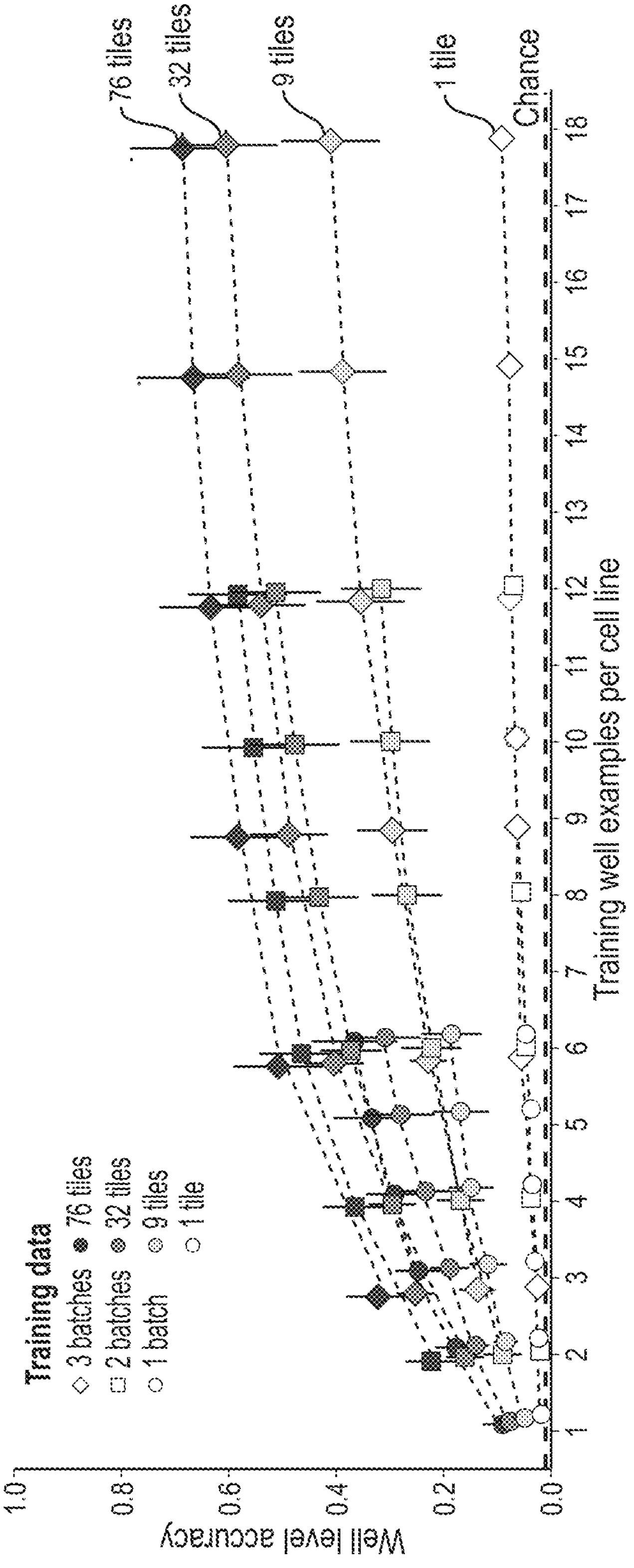

FIGS. 9A-9C shows a robust identification of individual cell lines across batches and plate layouts. Specifically, FIG. 9A shows a 96-way cell line classification task uses a cross-validation strategy with held-out batch and plate-layout. Left panel of FIG. 9B shows that test set cell line-level classification accuracy is much higher than chance for both deep image embeddings and CellProfiler features using a variety of models (logistic regression (L), ridge regression (R), multilayer perceptron (M), and random forest (F)). Error bars denote standard deviation across 8 batch/plate layouts. Right panel of FIG. 9B shows a histogram of cell line-level predicted rank of true cell line for the logistic regression model trained on cell image deep embeddings shows that the correct cell line is ranked first in 91% of cases. FIG. 9C describes results of a multilayer perceptron model trained on smaller cross sections of the entire dataset, down to a single well (average of cell image deep embeddings across 76 tiles) per cell line, which can identify a cell line in a held-out batch and plate layout with higher than chance well-level accuracy; accuracy rises with increasing training data. Error bars denote standard deviation. Dashed lines denote chance performance.

As shown in FIG. 9B, this analysis revealed that models trained on CellProfiler features and deep image embeddings performed better than chance and the baseline image statistics. The logistic regression model trained on well-mean cell image deep embeddings (i.e., a single 320-D vector representing each well) achieved a cell line-level (i.e., averaging predictions across all six held-out test wells) accuracy (i.e., number of correct predictions divided by total examples) of 91% (6% SD), compared to a 1.0% (i.e., 1 out of 96) expected accuracy by chance alone. In cases when this model's prediction was incorrect, the predicted rank of the correct cell line was still at most within the top 22 out of 96 lines (right panel of FIG. 9B). A review of the model's errors presented as a confusion matrix did not reveal any particular pattern in the errors. In summary, these results show that the model can successfully detect variation between individual cell lines by correctly identifying cell lines across different experimental batches and plate layouts.

To determine how the quantity of available training data impacts the detection of this cell line-specific signal, the training data was varied by reducing the number of tile images per well (from 76 to 1) and well examples (from 18 to 1 (6 plates per batch and 3 batches to 1 plate from 1 batch)) per cell line with a multilayer perceptron model (which can be trained on a single data point per class) trained on well-averaged cell image deep embeddings (FIG. 9C) and evaluated on a held-out batch using well-level accuracy (i.e., taking only the prediction from each well, without averaging multiple such predictions). Although reducing the number of training wells per cell line or tiles per well reduced accuracy, remarkably, a model trained on just a single well data point (i.e., the average of cell image deep embeddings from 76 tiles in that well) per cell line from a single batch still achieved 9% (3% SD) accuracy, compared to 1.0% chance. Collectively, these results indicate the presence of robust line-specific signatures, which our deep learning platform is notably able to distinguish with minimal training data.

Cell morphology is similar across multiple lines from the same donor. Next, the identified signal in a given cell line was assessed to establish that it was in fact a characteristic of the donor rather than an artifact of the cell line handling process or biopsy procedures (e.g., location of skin biopsy). For this purpose, further analysis was conducted on second biopsy samples provided by 5 of the 91 donors 3 to 6 years after their first donation. The logistic regression was retrained on cell image deep embeddings on a modified task consisting of only one cell line from each of the 91 donors with batch and plate layout held out as before. After training, the model was tested by evaluating the ranking of the 5 held-out second skin biopsies among all 91 possible predictions, in the held-out batch and plate-layout. This train and test procedure was repeated, interchanging whether the held-out set of lines corresponded to the first or second skin biopsy.

Figure 10A:
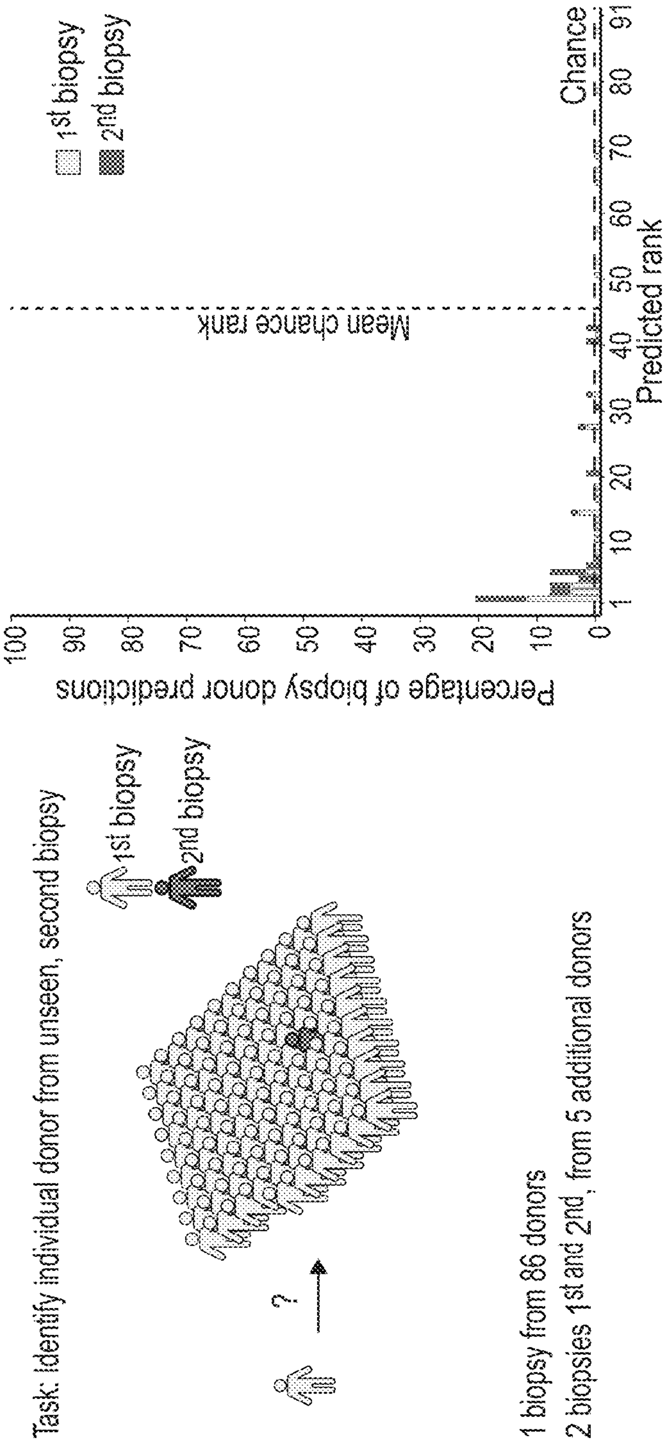
FIGS. 10A and 10B show donor-specific signatures revealed in analysis of repeated biopsies from individuals
Figure 10B:
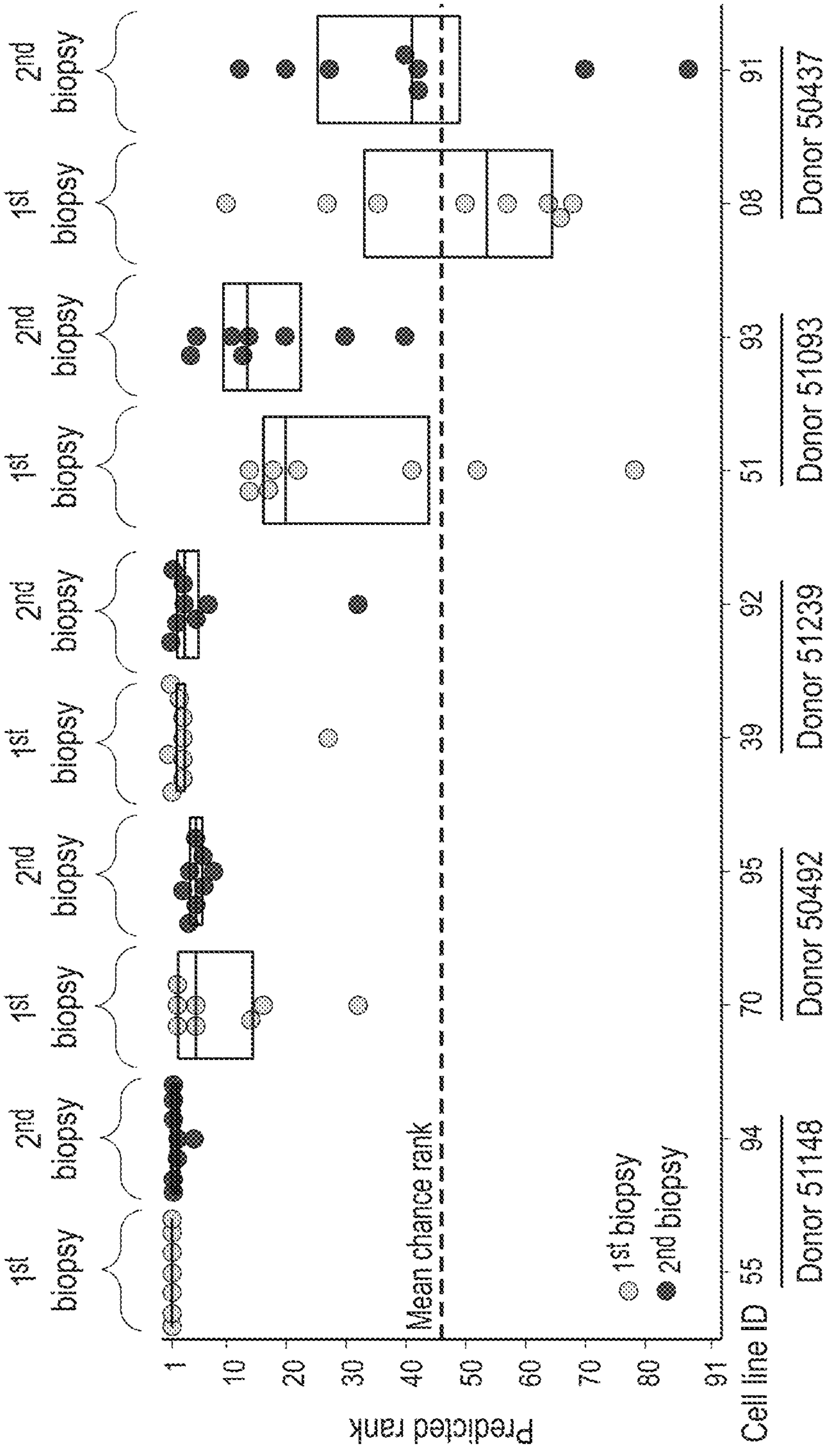

Specifically, FIGS. 10A and 10B show donor-specific signatures revealed in analysis of repeated biopsies from individuals. The left panel of FIG. 10A shows that a 91-way biopsy donor classification task uses a cross-validation strategy with held-out cell lines, and also held-out batch and plate layout. The right panel of FIG. 10A shows a histogram, whereas FIG. 10B shows box plots of test set cell line-level predicted rank among 91 biopsy donors of the 8 held-out batch/plate layouts for 10 biopsies (first and second from 5 individuals) assessed, showing the correct donor is identified in most cases for 4 of 5 donors. Dashed lines denote chance performance. Box plot components are: horizontal line, median; box, interquartile range.

The models achieved 21% (13% SD) accuracy in correctly identifying which of the 91 possible donors the held-out cell line came from, compared to 1.1% (i.e., 1 out of 91) by chance (right panel of FIG. 10A). In cases where the model's top prediction was incorrect, the predicted rank of the correct donor was much higher than chance for four of the five donors (FIG. 10B), even though the first and second skin biopsies were acquired years apart. In one case (donor 51239), the second biopsy was acquired from the right arm instead of the left arm, but the predicted rank was still higher than chance. The one individual (donor 50437) whose second biopsy was not consistently ranked higher than chance was the only individual who had one of the two biopsies acquired from the leg instead of both biopsies taken from the arm. Taken together, the model was able to identify donor-specific variations in morphological signatures that were unrelated to cell handling and derivation procedures, even across experimental batches.

Example 2: Predictive Model Differentiates Cells According to Parkinson's Disease State

Methods

LRRK2 and sporadic PD classification analysis. For each of the various data sources, the demographically-matched healthy/PD cell line pairs were partitioned into 5 groups with a near-even distribution of PD mutation, sex and age, which were then used as folds for cross-validation. For a given group, a model was trained on the other 4 groups on a binary classification task, healthy vs. PD, before testing the model on the held-out group of cell line pairs. The model predictions on the held-out group were used to compute a receiver operator characteristic (ROC) curve, for which the area under the curve (ROC AUC) can be evaluated. The ROC curve is the true positive rate vs. false positive rate, evaluated at different predicted probability thresholds. ROC AUC can be interpreted as the probability of correctly ranking a random healthy control and PD cell line. The ROC AUC was computed for cell line-level predictions, the average of the models' predictions for each well from each cell line. The ROC AUC was evaluated for a given held-out fold in three ways: with model predictions for both all sporadic and LRRK2 PD vs. all controls, all LRRK2 PD vs. all controls, and all sporadic PD vs. all controls. Overall ROC AUC were obtained by taking the average and standard deviation across the 5 cross-validation sets.

PD classification analysis with GBA PD cell lines. For a preliminary analysis only, the PD vs. healthy classification task was conducted with a simplified cross-validation strategy, where matched PD and healthy cell line pairs were randomly divided into a train half and a test half 8 times. This was done for all matched cell line pairs, just GBA PD and matched controls, just LRRK2 PD and matched controls, and just sporadic PD and matched controls. Test set ROC AUC was evaluated as in the above analysis.

CellProfiler feature importance analysis. First, a threshold number was estimated for the number of top-ranked CellProfiler features for a random forest classifier (1000 base estimators) required to maintain the same classification performance as the full set of 3483 CellProfiler features, by evaluating performance for sets of features increasing in size in increments of 20 features. After selecting 1200 as the threshold, the top 1200 features were investigated for each of the logistic regression, ridge regression and a random forest classifier models. The 100 CellProfiler features shared in common across all five folds of all three model architectures were further filtered using a Pearson's correlation value threshold of 0.75, leaving 55 features and subsequently grouped based on semantic properties. A feature was selected at random from each of 4 randomly selected groups to inspect the distribution of their values and representative cells from each disease state, with the closest value to the distribution median and quantiles, were selected for inspection. The statistical differences were evaluated using a two-sided Mann-Whitney U test, Bonferroni adjusted for 2 comparisons.

Results

Deep learning-based morphological profiling can separate PD fibroblasts (sporadic and LRRK2) from healthy controls. The ability of the platform was evaluated for its ability to achieve its primary goal of distinguishing between cell lines from PD patients and healthy controls.

Figure 11:
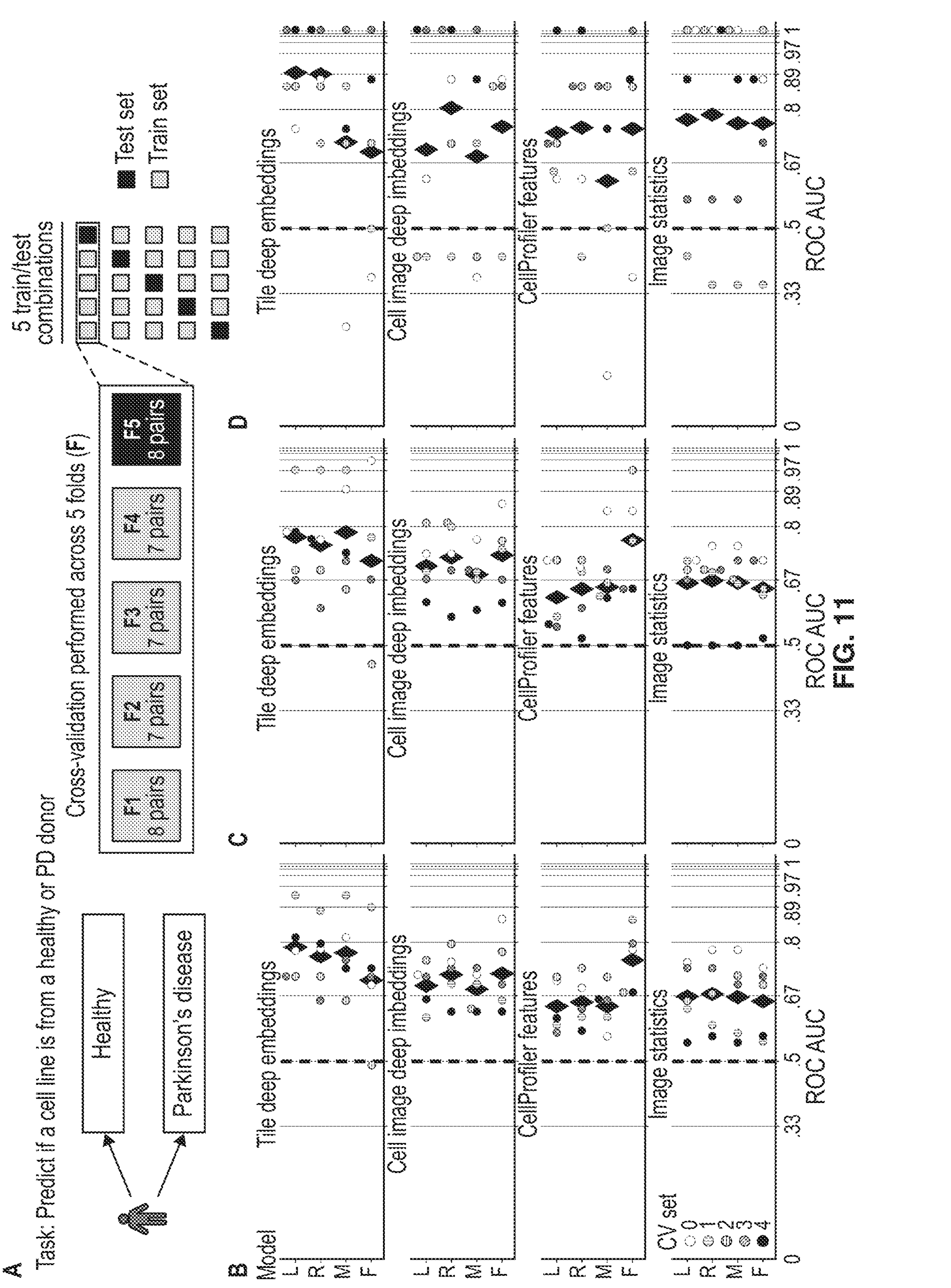
FIG. 11 shows PD-specific signatures identified in sporadic and LRRK2 PD primary fibroblasts.

Sporadic PD and LRRK2 PD participants were divided, and paired demographically with matched healthy controls (n=74 participants) into 5 groups for 5-fold cross-validation, where a model is trained to predict healthy or PD on 4 of the 5 sets of the cell line pairs and tested on the held-out 5th set of cell lines (top row of FIG. 11). Evaluating performance involved using the area under the receiver operating characteristic curve (ROC AUC) metric, which evaluates the probability of ranking a random healthy cell line as "more healthy" than a random PD cell line, where 0.5 ROC AUC is chance and 1.0 is a perfect classifier. Following training, the ROC AUC was evaluated on the test set in three ways: first with both sporadic and LRRK2 PD (n=37 participants) vs. all controls (n=37 participants), then with the sporadic PD (n=31 participants) vs. all controls (n=37 participants), and then with LRRK2 PD (n=6 participants) vs. all controls (n=37 participants).

As in the above analyses, both cell and tile deep embeddings, CellProfiler features, and image statistics were used as data sources for model fitting in PD vs. healthy classification. FIG. 11 shows PD-specific signatures identified in sporadic and LRRK2 PD primary fibroblasts. (a) PD vs. healthy classification task uses a k-fold cross-validation strategy with held-out PD-control cell line pairs. Cell line-level ROC AUC, the probability of correctly ranking a random healthy control and PD cell line evaluated on held out-test cell lines for (b) LRRK2/sporadic PD and controls (c) sporadic PD and controls and (d) LRRK2 PD and controls, for a variety of data sources and models (logistic regression (L), ridge regression (R), multilayer perceptron (M), and random forest (F)), range from 0.79-0.89 ROC AUC for the top tile deep embedding model and 0.75-0.77 ROC AUC for the top CellProfiler feature model. Black diamonds denote the mean across all cross-validation (CV) sets. Grid line spacing denotes a doubling of the odds of correctly ranking a random control and PD cell line and dashed lines denote chance performance.

The model with the highest mean ROC AUC, a logistic regression trained on tile deep embeddings, achieved a 0.79 (0.08 SD) ROC AUC for PD vs. healthy, while a random forest trained on CellProfiler features achieved a 0.76 (0.07 SD) ROC AUC (FIG. 11B). To investigate if the signal was predominantly driven by one of the PD subgroups, the average ROC AUCs for each was investigated. The model trained on tile deep embeddings achieved a 0.77 (0.10 SD) ROC AUC for separating sporadic PD from controls and 0.89 (0.10 SD) ROC AUC for separating LRRK2 PD from controls (FIGS. 11C and 11D), indicating that both patient groups contain strong disease-specific signatures.

Finally, to investigate the source of the predictive signal, the performance of the logistic regression trained on tile deep embeddings was investigated, but where the data either omitted one of the five Cell Painting stains or included only a single stain, in performing sporadic and LRRK2 PD vs. healthy classification (Supplementary FIG. 5). Interestingly, the performance was only minimally affected by the removal of any one channel, indicating that the signal was robust. These results demonstrate that our platform can successfully distinguish PD fibroblasts (either LRRK2 or sporadic) from control fibroblasts.

Fixed feature extraction and analysis reveal biological complexity of PD-related signatures. Lastly, the CellProfiler features were further explored to investigate which biological factors might be driving the separation between disease and control, focusing on random forest, ridge regression, and logistic regression model architectures, as these provide a ranking of the most meaningful features. The number of top-ranking features were first estimated among the total set of 3483 features that were sufficient to retain the performance of the random forest classifier on the entire feature set and found the first 1200 to be sufficient.

Figure 12A:
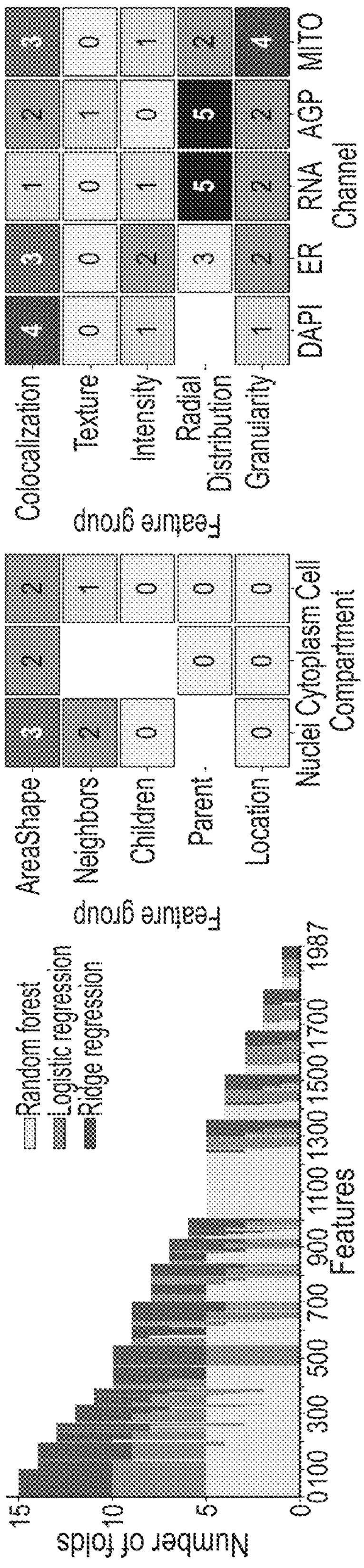
FIGS. 12A-12C reveals that PD is driven by a large variety of cell features.
Figure 12B:
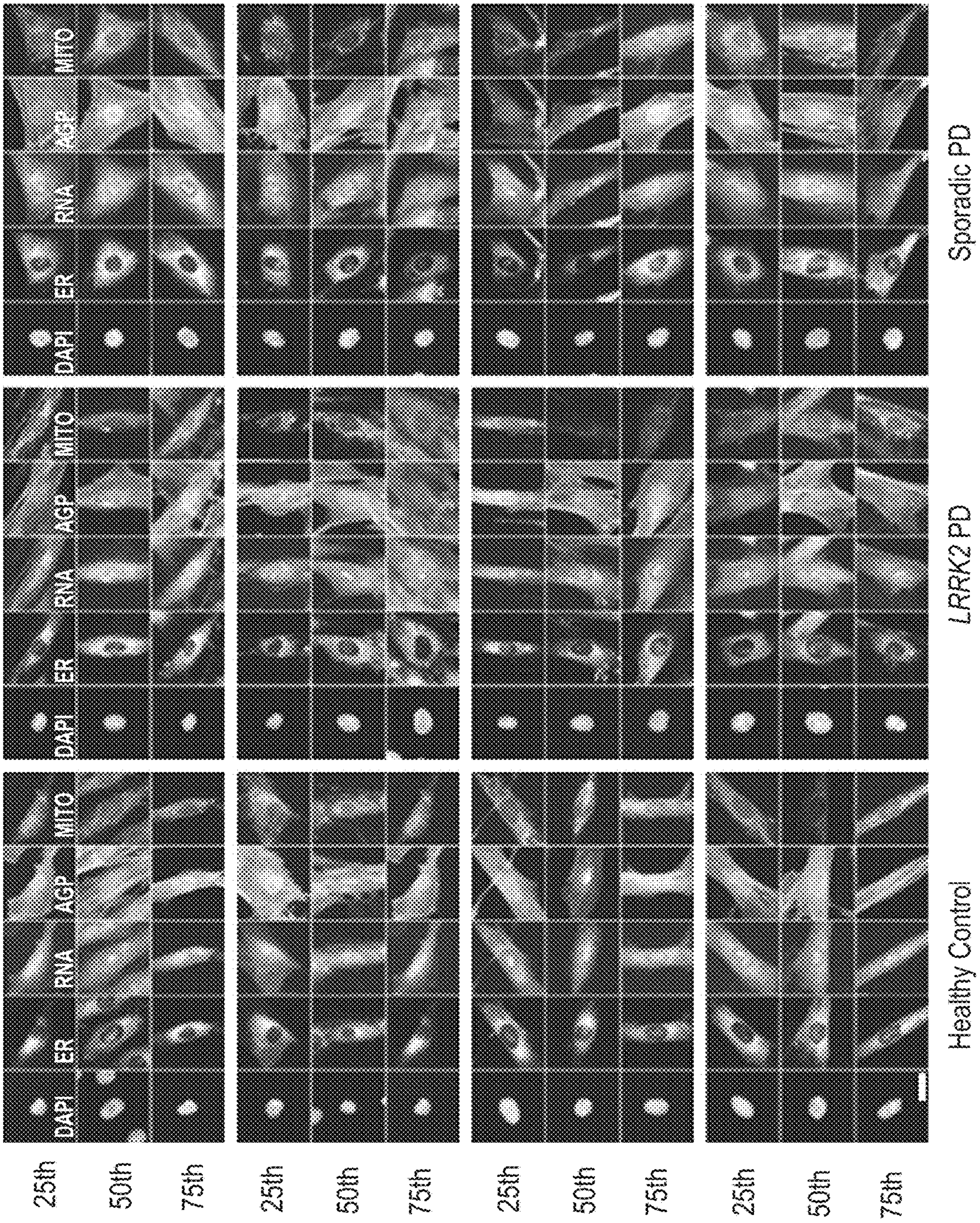
Figure 12C:
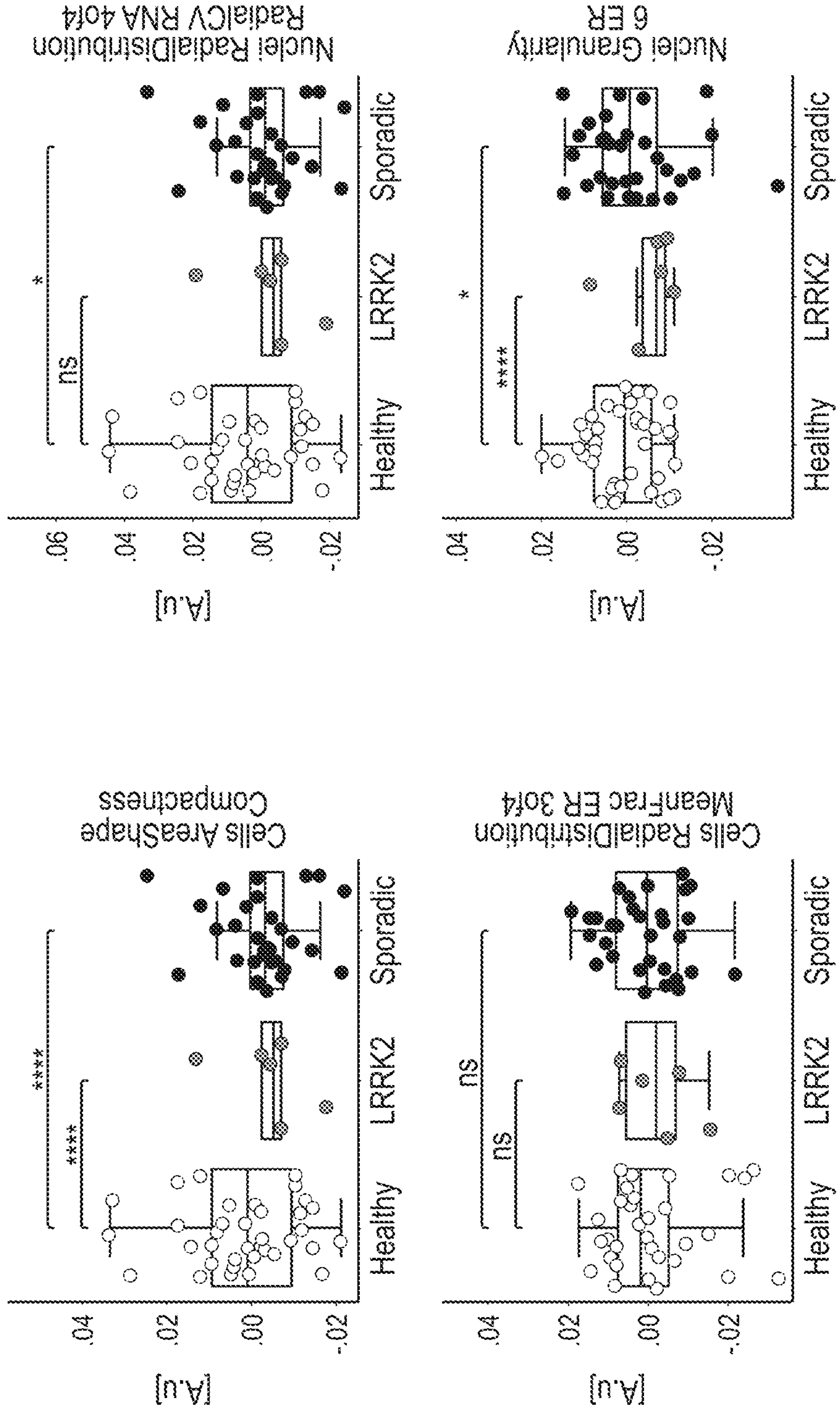

FIGS. 12A-12C show that reveals that PD is driven by a large variety of cell features. Left panel of FIG. 12A shows frequency among 5 cross-validation folds of 3 models where a CellProfiler feature was within the 1200 most important of the 3483 features reveals a diverse set of features supporting PD classification. Middle and right panels of FIG. 12A show frequency of each class of Cell Painting features of the 100 most common features in a, with correlated features removed. FIGS. 12B and 12C show images of representative cells and respective cell line-level mean feature values (points and box plot) for 4 features randomly selected from those in b. Cells closest to the 25th, 50th and 75th percentiles were selected. Scale bar: 20 μm. Box plot components are: horizontal line, median; box, interquartile range; whiskers, 1.5× interquartile range. A.u.: arbitrary units. Mann-Whitney U test: ns: $p>5.0\times10^{-2}$;*: $10^{-2}<p\leq5.0\times10^{-2}$;: $10^{-3}<p\leq10^{-2}$;*: $10^{-4}<p\leq10^{-3}$; ****: $p\leq10^{-4}$.

Among the top 1200 features of each of the 3 model architectures (each with 5 cross-validation folds), 100 features were present in all 15 folds (left panel of FIG. 12A). From among these, correlated features were removed using a Pearson correlation threshold of 0.75, leaving 55 uncorrelated features. To see if these best performing features held any mechanistic clues, these features were grouped based on their type of measurement (e.g., shape, texture, and intensity) and their origin by cellular compartment (cell, nucleus or cytoplasm) or image channel (DAPI, ER, RNA, AGP, and MITO). Such groupings resulted in features implicated in "area and shape," "radial distribution" of signal within the RNA and AGP channels, and the "granularity" of signal in the mitochondria channel (middle and right panels of FIG. 12A).

From this pool of 55 features, 4 features were randomly selected and inspected for their visual and statistical attributes for control, sporadic PD, and LRRK2 PD cell lines (FIG. 12C). Although most of the 55 features were significantly different between control and both LRRK2 PD (42 had $p<5\times10^{-2}$, Mann-Whitney U test) and sporadic PD lines (47 had $p<5\times10^{-2}$, Mann-Whitney U test), there was still considerable variation within each group. Furthermore, these differences were not visually apparent in representative cell images (FIG. 12B). Collectively, the results show that the power of our models to accurately classify PD relies on a large number and complex combination of different morphological features, rather than a few salient ones. Altogether, this analysis showed that the classification of healthy and PD states relied on over 1200 features, where even the most common important features were not discernable by eye. Taken together, this analysis indicates that the detected PD-specific morphological signatures are extremely complex.

Example 3: Predictive Model Differentiates Healthy and PD Subtypes Following Treatment Using Perturbations In this example, the same automated platform as described above in Examples 1 and 2 was implemented to morphologically profile large collections of cells that were treated using any of a number of perturbations. Example perturbations include bafilomycin, carbonyl cyanide m-chlorophenyl hydrazone (CCCP), MG312, rotenone, valinomycin as well as control groups (untreated and 0.16% DMSO). Specifically, healthy or PD cells of known subtype (e.g., LRKK2 subtype or sporadic subtype) were cultured in vitro and treated with varying doses of the perturbations. For example, for bafilomycin, treatments included 15.63 nM, 31.25 nM, and 62.5 nM bafilomycin. For CCCP, the treatments included 390.5 nM, 781 nM, and 1562 nM. For MG312, the treatments included 234.38 nM, 468.75 nM, and 937.5 nM. For rotenone, the treatments included 7.81 nM, 15.63 nM, and 31.25 nM. For valinomycin, the treatments included 3.91 nM, 7.81 nM, and 15.63 nM.

Following in vitro treatment of healthy cells and PD subtype cells using the aforementioned concentrations of perturbagens, the cells were imaged using the automated imaging platform and subsequently analyzed using predictive models. In particular, three predictive models were implemented: 1) predictive model including tile embeddings, 2) predictive model including single cell embeddings, and 3) predictive model including extracted features (e.g., CellProfiler features).

Figure 13A:
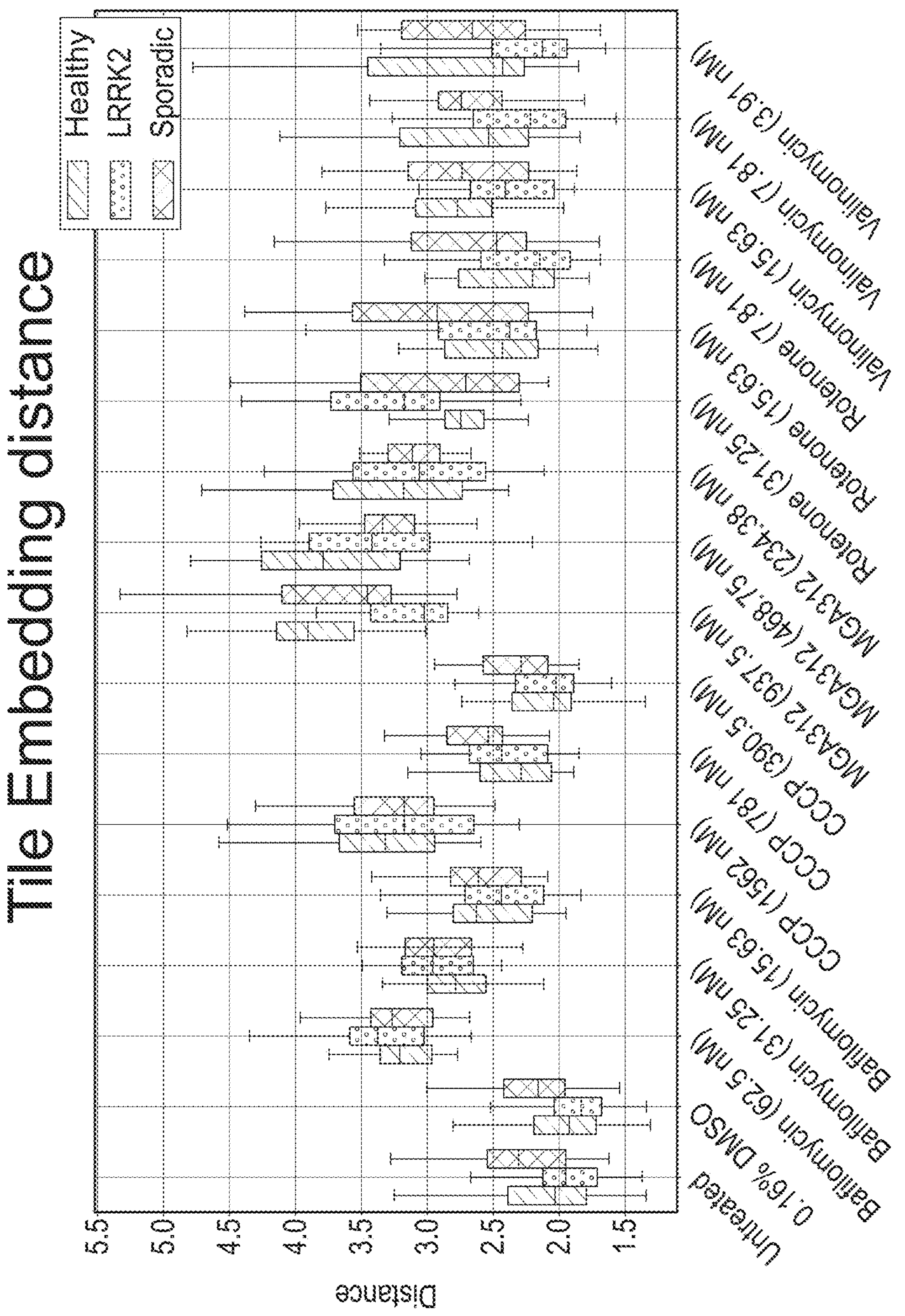
FIGS. 13A-13C show relative distance between treated cell groups in comparison to control (e.g., 0.16% DMSO) treated cells for each of the three models (e.g., tile embedding, single cell embeddings, and feature vector).
Figure 13B:
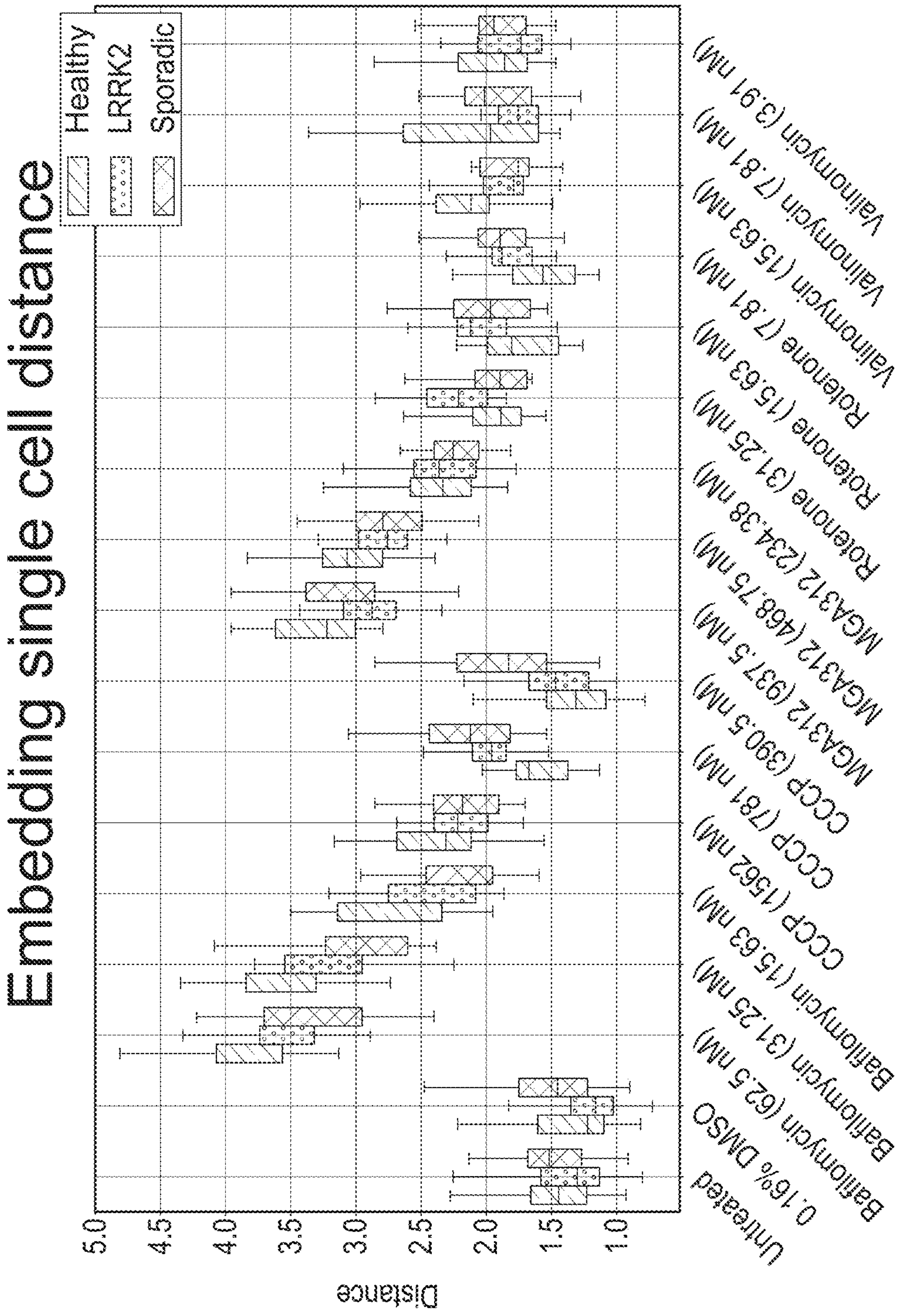
Figure 13C:
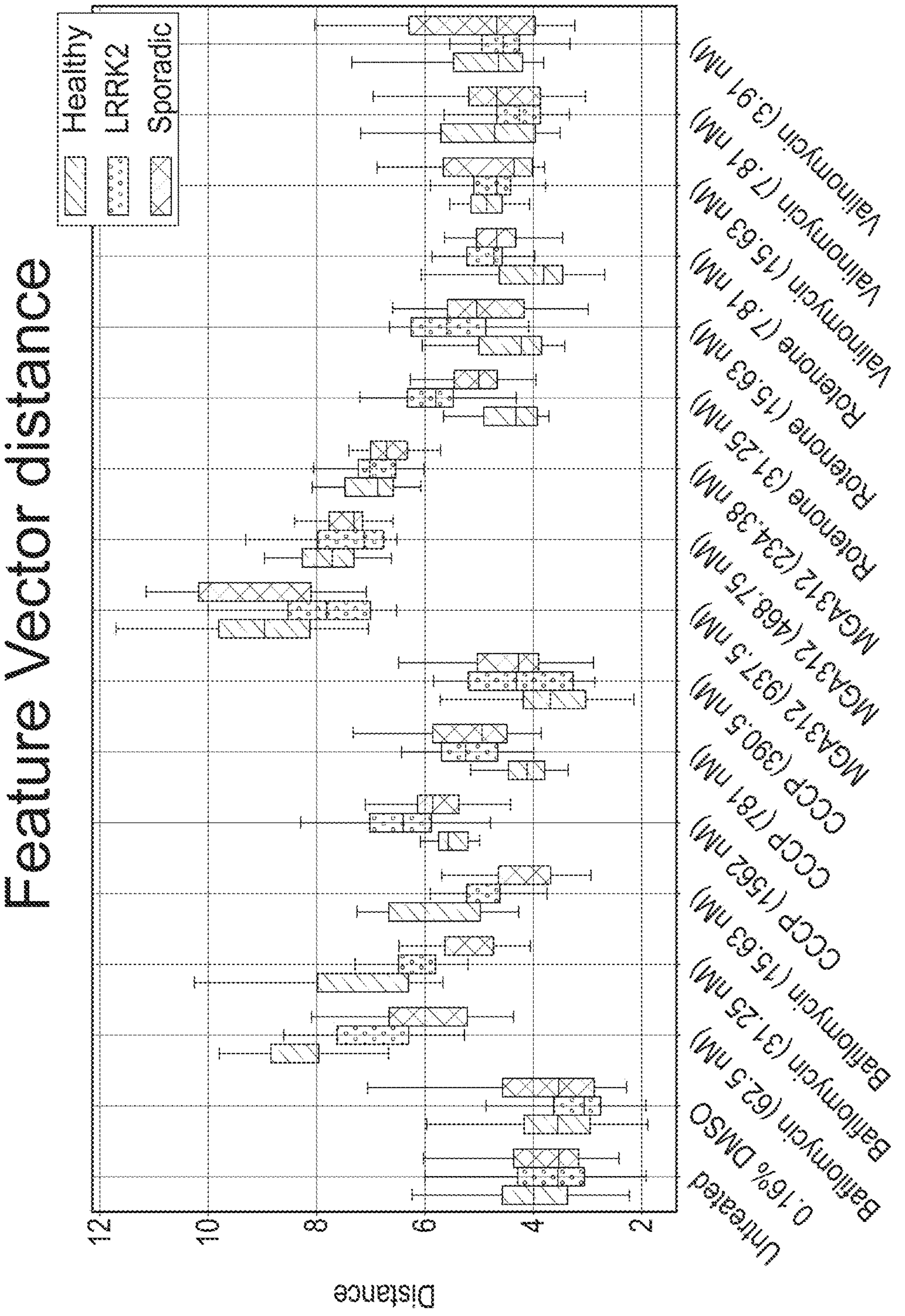

FIGS. 13A-13C show the relative distance between each treated cell group in comparison to controls (e.g., 0.16% DMSO) for each of the three models (e.g., tile embedding, single cell embeddings, and feature vector). Specifically, FIG. 13A shows the relative distance between treated cell groups in comparison to controls when using tile embeddings. FIG. 13B shows the relative distance between treated cell groups in comparison to controls when using single cell tile embeddings. FIG. 13C shows the relative distance between treated cell groups in comparison to controls when using feature vectors.

Generally, across each of the three predictive models, FIGS. 13A-13C show a dose dependent response for several of the therapeutic agents. Specifically, the relative distance increases as the concentration of the therapeutic agent increases. For example, referring to bafilomycin shown in each of FIGS. 13A-13C, each of the healthy, LRRK2, and sporadic PD cells increase in distance in response to increasing dose of bafilomycin. This indicates that the predictive models can identify the morphological changes exhibited by the cells in response to increasing concentrations of bafilomycin. A similar dose-response effect is observed for the MG312 perturbation across all three predictive models, again indicating that the predictive models can identify morphological changes exhibited by the cells in response to increase concentrations of MG312.

Table 1 shows performance metrics of the three different models in their ability to classify healthy versus PD disease state cells following perturbation. Furthermore, Table 2 shows performance metrics of the three different models in their ability to classify different PD subtypes (e.g., LRRK2 v. Sporadic PD) following perturbation. In general, predictive models were able to distinguish healthy v. PD and LRRK2 v. sporadic PD even after the cells were treated with a perturbation.

In particular scenarios, treating the cells with a perturbation improved the predictive models ability to perform the classification task. For example, referring to Table 1, the AUC using Tile Embeddings and the Accuracy using Tile Embeddings for the DMSO control was 0.70 and 0.72, respectively. However, the addition of bafilomycin increased the corresponding AUC and Accuracy to 0.73 and 0.75, respectively, indicating that treating cells with bafilomycin improved the predictive model's ability to distinguish between healthy and PD diseased cells. Similarly, as shown in Table 1 the AUC and Accuracy using the feature vector was 0.67 and 0.69. The addition of bafilomycin increased the corresponding AUC and Accuracy to 0.83 and 0.85, respectively, again indicating that treating cells with bafilomycin improved the predictive model's ability to distinguish between healthy and PD diseased cells. Here, bafilomycin can be a therapeutic agent that causes cells to enter into a more diseased state. This effect may be different on PD cells as opposed to healthy cells, thereby enabling the predictive models to more accurately distinguish between healthy and PD cells.

TABLE 1

Performance metrics (AUC and accuracy) of the predictive models using single cell embeddings, tile embeddings, or feature vector for distinguishing healthy versus PD following perturbation.

| | DMSO | Bafilomycin | CCCP | MG31 | Rotenone | Valinomycin | Untreated |
|---|---|---|---|---|---|---|---|
| AUC using Single Cell Embeddings | 0.68 | 0.67 | 0.67 | 0.67 | 0.64 | 0.61 | 0.67 |
| Accuracy using Single Cell Embeddings | 0.71 | 0.70 | 0.69 | 0.71 | 0.66 | 0.64 | 0.71 |
| AUC using Tile Embeddings | 0.70 | 0.73 | 0.55 | 0.67 | 0.51 | 0.52 | 0.63 |
| Accuracy using Tile Embeddings | 0.72 | 0.75 | 0.58 | 0.71 | 0.49 | 0.46 | 0.66 |
| AUC using Feature Vector | 0.67 | 0.83 | 0.61 | 0.57 | 0.72 | 0.68 | 0.62 |
| Accuracy using Feature Vector | 0.69 | 0.85 | 0.62 | 0.54 | 0.75 | 0.70 | 0.61 |

TABLE 2

Performance metrics (AUC and accuracy) of the predictive models using single cell embeddings, tile embeddings, or feature vector for distinguishing PD disease states (e.g., LRRK2 v. Sporadic) following perturbation.

| | DMSO | Bafilomycin | CCCP | MG31 | Rotenone | Valinomycin | Untreated |
|---|---|---|---|---|---|---|---|
| Sporadic PD, AUC using Single Cell Embeddings | 0.57 | 0.57 | 0.59 | 0.57 | 0.59 | 0.53 | 0.58 |
| LRRK2 PD, AUC using Single Cell Embeddings | 0.86 | 0.84 | 0.77 | 0.83 | 0.72 | 0.73 | 0.83 |
| Sporadic PD, Accuracy using Single Cell Embeddings | 0.57 | 0.56 | 0.59 | 0.56 | 0.59 | 0.53 | 0.57 |
| LRRK2 PD, Accuracy using Single Cell Embeddings | 0.81 | 0.80 | 0.76 | 0.74 | 0.72 | 0.71 | 0.79 |
| Sporadic PD, AUC using Tile Embeddings | 0.62 | 0.66 | 0.45 | 0.59 | 0.20 | 0.29 | 0.52 |
| LRRK2 PD, AUC using Tile Embeddings | 0.85 | 0.87 | 0.68 | 0.79 | 0.71 | 0.66 | 0.80 |
| Sporadic PD, Accuracy using Tile Embeddings | 0.61 | 0.65 | 0.45 | 0.59 | 0.32 | 0.37 | 0.51 |
| LRRK2 PD, Accuracy using Tile Embeddings | 0.84 | 0.86 | 0.65 | 0.74 | 0.70 | 0.66 | 0.76 |

TABLE 2-continued

Performance metrics (AUC and accuracy) of the predictive models using single cell embeddings, tile embeddings, or feature vector for distinguishing PD disease states (e.g., LRRK2 v. Sporadic) following perturbation.

| | DMSO | Bafilomycin | CCCP | MG31 | Rotenone | Valinomycin | Untreated |
|---|---|---|---|---|---|---|---|
| Sporadic PD, AUC using Feature Vector | 0.56 | 0.78 | 0.58 | 0.33 | 0.68 | 0.65 | 0.55 |
| LRRK2 PD, AUC using Feature Vector | 0.84 | 0.91 | 0.67 | 0.75 | 0.78 | 0.76 | 0.72 |
| Sporadic PD, Accuracy using Feature Vector | 0.56 | 0.78 | 0.58 | 0.40 | 0.68 | 0.64 | 0.54 |
| LRRK2 PD, Accuracy using Feature Vector | 0.80 | 0.90 | 0.67 | 0.75 | 0.77 | 0.76 | 0.72 |

What is claimed is:

1. A method comprising:

obtaining or having obtained a cell;

capturing one or more images of the cell; and analyzing the one or more images using a predictive model to predict a neurodegenerative disease state of the cell, the predictive model trained to distinguish between morphological profiles of cells of different neurodegenerative disease states, and the morphological profile being extracted from a layer of a deep learning neural network or being an embedding representing a dimensionally reduced representation of values of the layer of the deep learning neural network.

2. The method of claim 1, further comprising:

prior to capturing the one or more images of the cell, providing a perturbation to the cell;

subsequent to analyzing the one or more images, comparing the predicted neurodegenerative disease state of the cell to a neurodegenerative disease state of the cell known before providing the perturbation; and based on the comparison, identifying the perturbation as having one of a therapeutic effect, a detrimental effect, or no effect.

3. The method of claim 1, wherein the predictive model is one of a neural network, random forest, or regression model.

4. The method of claim 1, wherein each of the morphological profiles of cells of different neurodegenerative disease states comprises values of imaging features or a transformed representation of images that define a neurodegenerative disease state of a cell.

5. The method of claim 1, wherein:

the imaging features comprise one or more of cell features or non-cell features, the cell features comprise one or more of cellular shape, cellular size, cellular organelles, object-neighbors features, mass features, intensity features, quality features, texture features, and global features, and the non-cell features comprise well density features, background versus signal features, and percent of touching cells in a well.

6. The method of claim 1, wherein the predicted neurodegenerative disease state of the cell predicted by the predictive model is a classification of at least two categories.

7. The method of claim 1, wherein the neurodegenerative disease is any one of Parkinson's Disease (PD), Alzheimer's Disease, Amyotrophic Lateral Sclerosis (ALS), Infantile Neuroaxonal Dystrophy (INAD), Multiple Sclerosis (MS), Amyotrophic Lateral Sclerosis (ALS), Batten Disease, Charcot-Marie-Tooth Disease (CMT), Autism, post-traumatic stress disorder (PTSD), schizophrenia, frontotemporal dementia (FTD), multiple system atrophy (MSA), and a synucleinopathy.

8. The method of claim 1, wherein the cell is one of a stem cell, partially differentiated cell, or terminally differentiated cell.

9. The method of claim 1, wherein the cell is a somatic cell selected from a fibroblast or a peripheral blood mononuclear cell (PBMC).

10. The method of claim 1, wherein the predictive model is trained by:

obtaining or having obtained a cell of a known neurodegenerative disease state;

capturing one or more images of the cell of the known neurodegenerative disease state; and using the one or more images of the cell of the known neurodegenerative disease state, to train the predictive model to distinguish between morphological profiles of cells of different diseased states.

11. The method of claim 10, wherein the known neurodegenerative disease state of the cell serves as a reference ground truth for training the predictive model.

12. The method of claim 1, further comprising:

prior to capturing the one or more images of the cell, staining or having stained the cell using one or more fluorescent dyes, wherein the one or more fluorescent dyes are Cell Paint dyes for staining one or more of a cell nucleus, cell nucleoli, plasma membrane, cytoplasmic RNA, endoplasmic reticulum, actin, Golgi apparatus, and mitochondria.

13. The method of claim 1, wherein:

each of the one or more images correspond to a fluorescent channel, and wherein obtaining the cell and capturing the one or more images of the cell are performed in a high-throughput format using an automated array.

14. The method of claim 1, wherein analyzing the one or more images using the predictive model comprises:

dividing the one or more images into a plurality of tiles; and analyzing the plurality of tiles using the predictive model on a per-tile basis.

15. A non-transitory computer readable medium comprising instructions that, when executed by a processor, cause the processor to:

capture one or more images of a cell; and analyze the one or more images using a predictive model to predict a neurodegenerative disease state of the cell, the predictive model trained to distinguish between morphological profiles of cells of different neurodegenerative disease states, and the morphological profile being extracted from a layer of a deep learning neural network or being an embedding representing a dimensionally reduced representation of values of the layer of the deep learning neural network.

16. The non-transitory computer readable medium of claim 15, further comprising instructions that, when executed by the processor, cause the processor to:

subsequent to analyze the one or more images, compare the predicted neurodegenerative disease state of the cell to a neurodegenerative disease state of the cell known before a perturbation was provided to the cell; and based on the comparison, identify the perturbation as having one of a therapeutic effect, a detrimental effect, or no effect.

17. The non-transitory computer readable medium of claim 15, wherein the predictive model is trained by:

capture one or more images of a cell of the known neurodegenerative disease state; and using the one or more images of the cell of the known neurodegenerative disease state to train the predictive model to distinguish between morphological profiles of cells of different diseased states.

18. The non-transitory computer readable medium of claim 15, wherein the cell was previously stained using one or more fluorescent dyes, and wherein the one or more fluorescent dyes are Cell Paint dyes for staining one or more of a cell nucleus, cell nucleoli, plasma membrane, cytoplasmic RNA, endoplasmic reticulum, actin, Golgi apparatus, and mitochondria.

19. The non-transitory computer readable medium of claim 15, wherein each of the one or more images correspond to a fluorescent channel.

20. The non-transitory computer readable medium of claim 15, wherein the instructions that cause the processor to analyze the one or more images further comprises instructions that, when executed by the processor, cause the processor to:

divide the one or more images into a plurality of tiles; and analyze the plurality of tiles using the predictive model on a per-tile basis.

* * * * *